(12) United States Patent
Sano et al.

(10) Patent No.: US 8,130,455 B2
(45) Date of Patent: Mar. 6, 2012

(54) IMAGE PICKUP LENS, IMAGE PICKUP UNIT, AND MOBILE TERMINAL

(75) Inventors: Eigo Sano, Hino (JP); Takashi Kawasaki, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 310 days.

(21) Appl. No.: 12/467,980

(22) Filed: May 18, 2009

(65) Prior Publication Data

US 2009/0290234 A1  Nov. 26, 2009

(30) Foreign Application Priority Data

May 21, 2008  (JP) .................. 2008-133125

(51) Int. Cl.
  *G02B 3/02*  (2006.01)
  *G02B 13/18*  (2006.01)
(52) U.S. Cl. ........................................ 359/715
(58) Field of Classification Search .......... 359/715, 359/771–773
See application file for complete search history.

(56) References Cited

U.S. PATENT DOCUMENTS

| 7,012,765 B2 * | 3/2006 | Matsui et al. ................. 359/771 |
| 2004/0012861 A1 * | 1/2004 | Yamaguchi .................... 359/772 |
| 2008/0266670 A1 * | 10/2008 | Liao ............................. 359/654 |

FOREIGN PATENT DOCUMENTS

| JP | 2002-365530 | 12/2002 |
| JP | 2004-341013 | 12/2004 |

* cited by examiner

*Primary Examiner* — James Greece
(74) *Attorney, Agent, or Firm* — Cozen O'Connor

(57) ABSTRACT

An image pickup lens includes, in order from an object side thereof: a first lens in a meniscus shape having a positive refractive power and including a convex surface facing the object side; a second lens having a negative refractive power and including a concave surface facing an image side of the image pickup lens; a third lens in a meniscus shape having a positive refractive power and including a convex surface facing the image side; and a fourth lens having a negative refractive power and including a concave surface facing the image side, where at least one surface of the fourth lens is in an aspheric shape. The image pickup lens satisfies a predetermined condition relating to a composite focal length of the first lens and the second lens, and a focal length of a total system of the image pickup lens.

11 Claims, 19 Drawing Sheets

FIG. 6 (a)   FIG. 6 (b)   FIG. 6 (c)
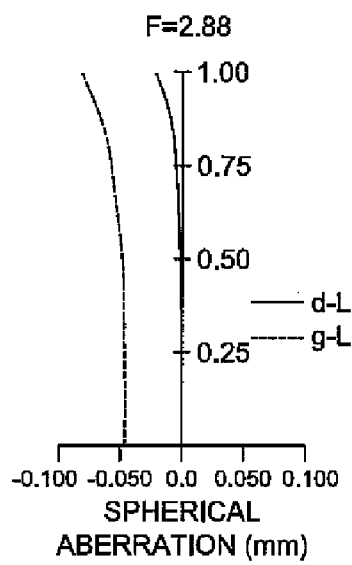
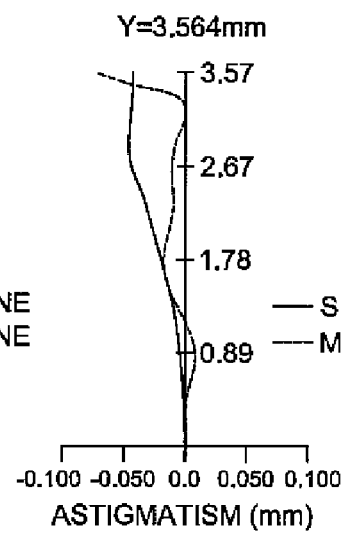
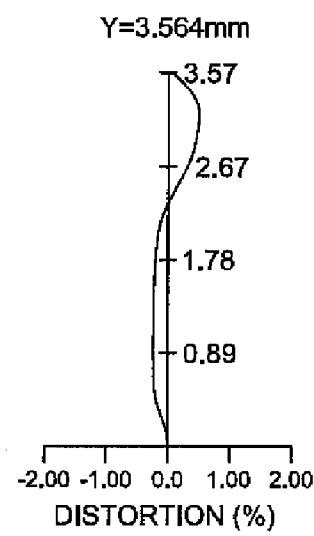
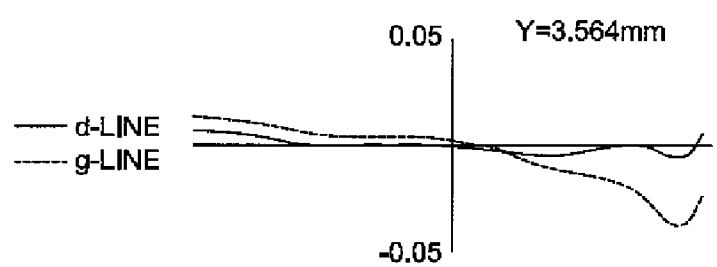
FIG. 6 (d)
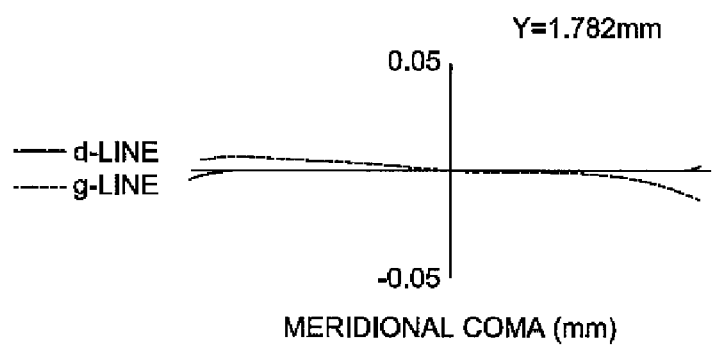

FIG. 8 (a)   FIG. 8 (b)   FIG. 8 (c)
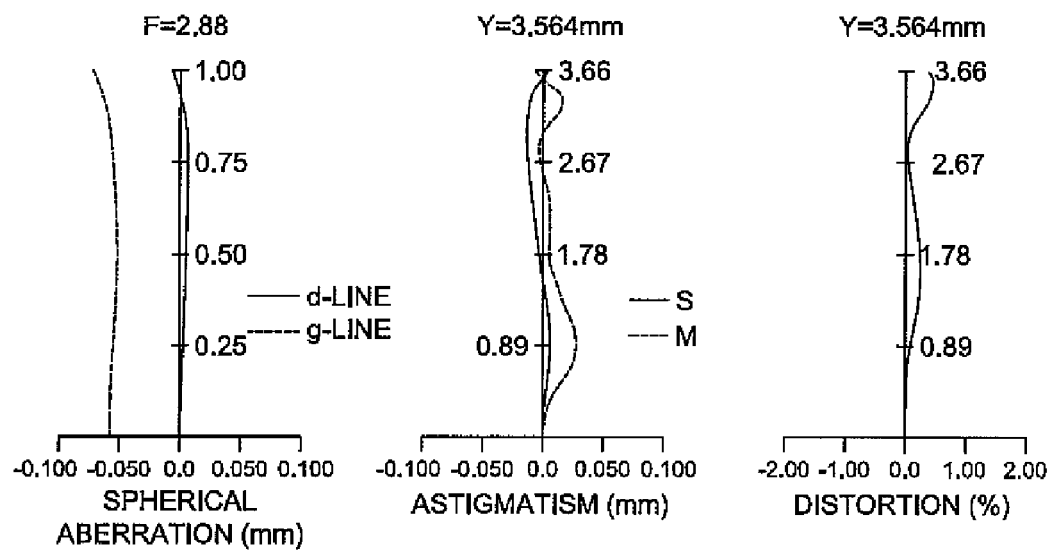
FIG. 8 (d)
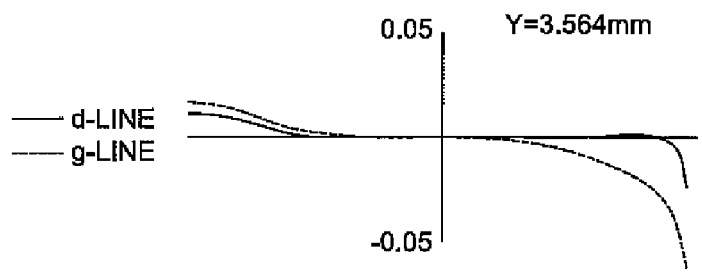
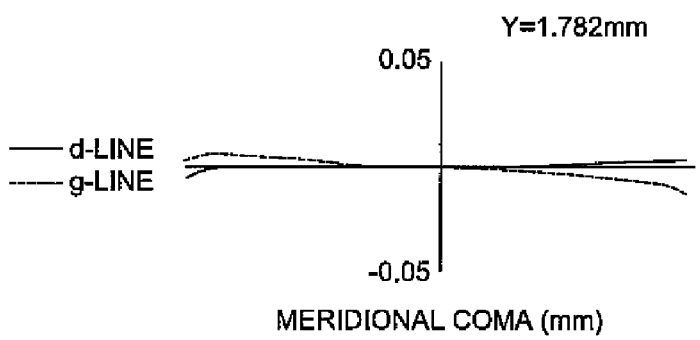

FIG. 10 (a) FIG. 10 (b) FIG. 10 (c)
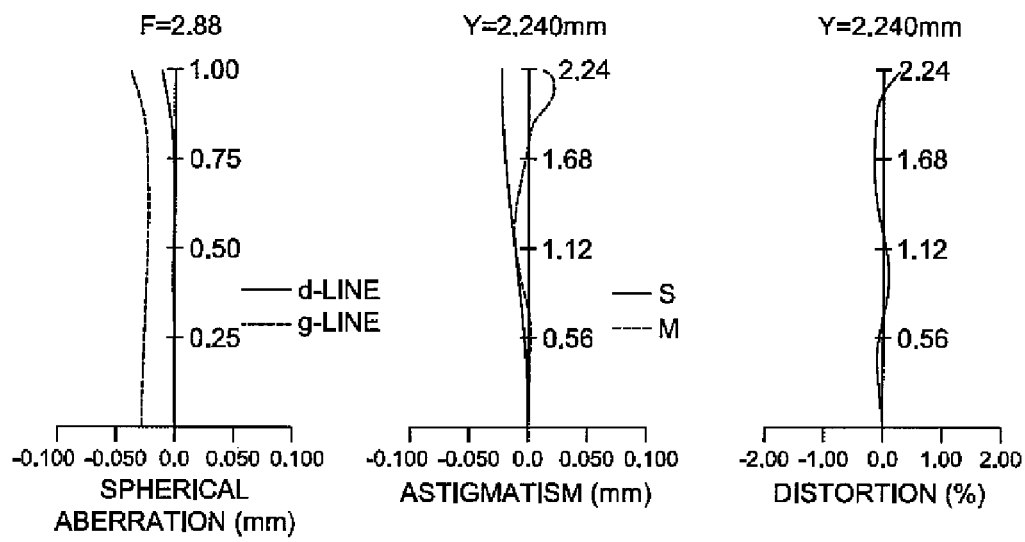
FIG. 10 (d)
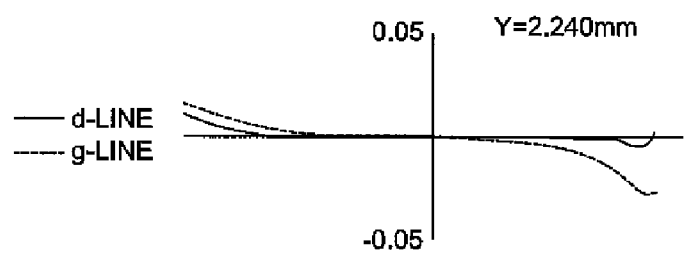
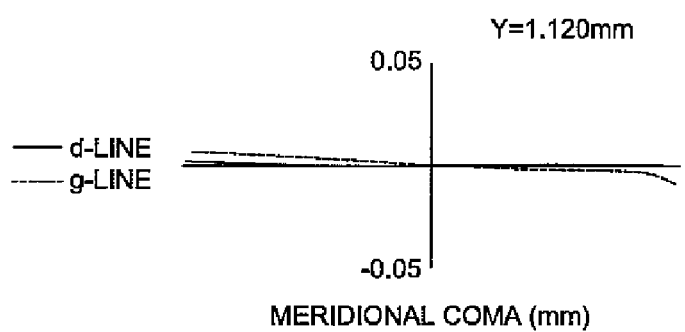

FIG. 12 (a)  FIG. 12 (b)  FIG. 12 (c)
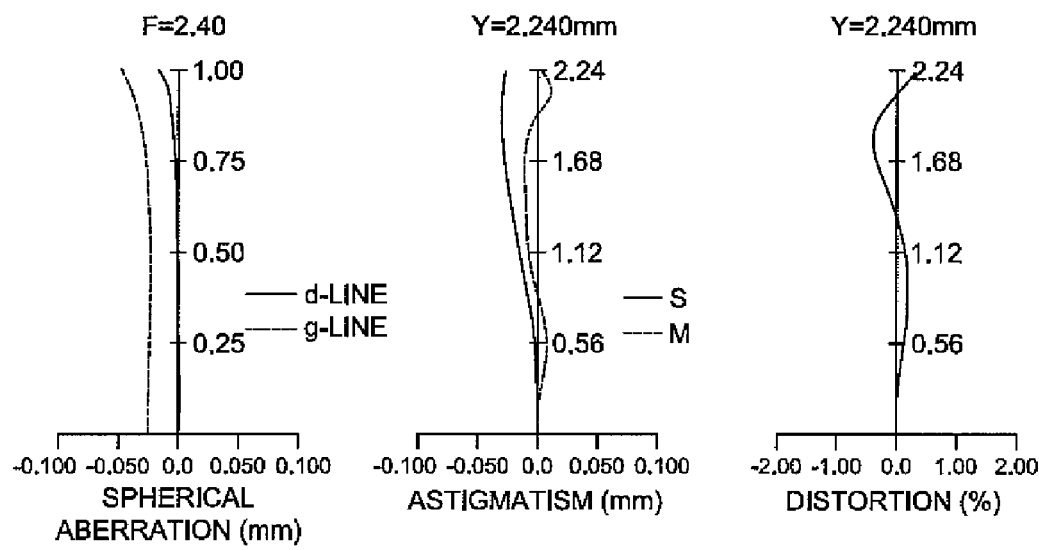
FIG. 12 (d)
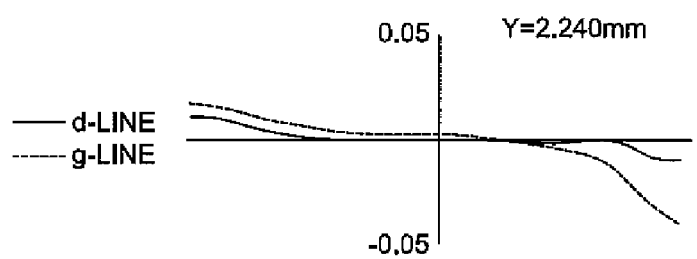
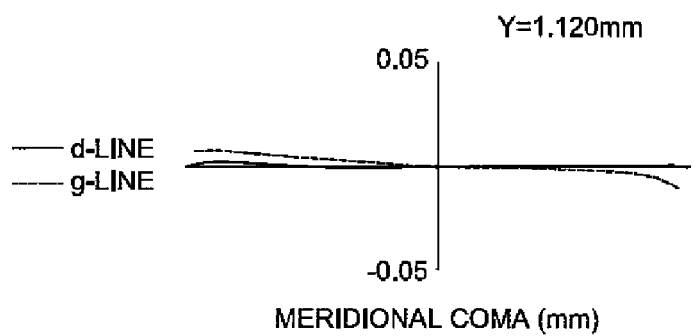

FIG. 14 (a) FIG. 14 (b) FIG. 14 (c)
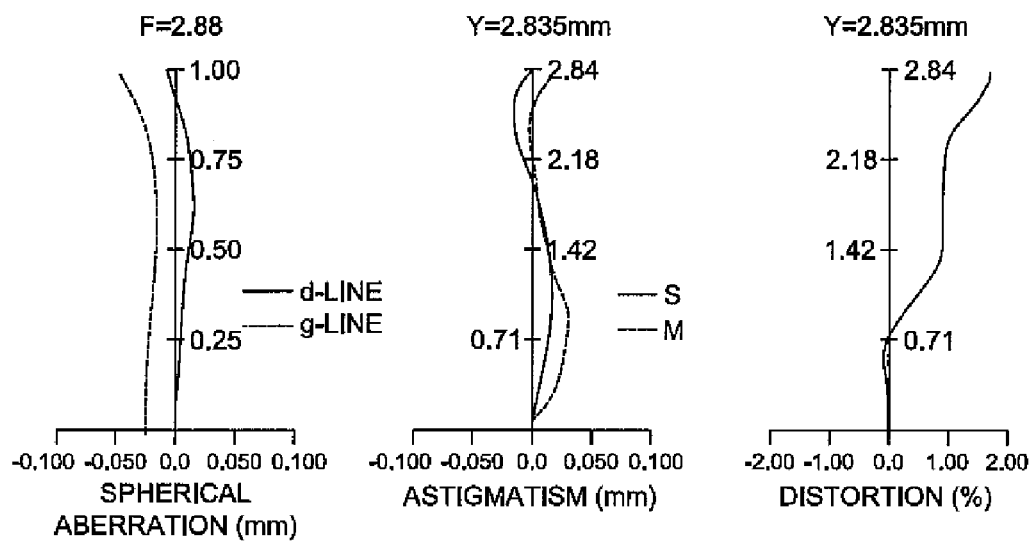
FIG. 14 (d)
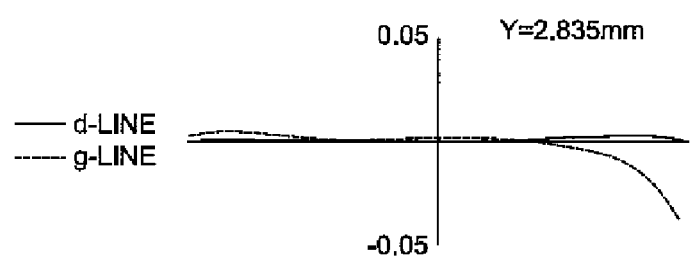
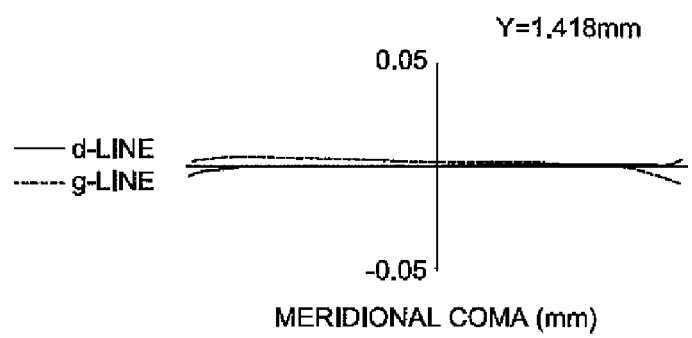

FIG. 16 (a)  FIG. 16 (b)  FIG. 16 (c)
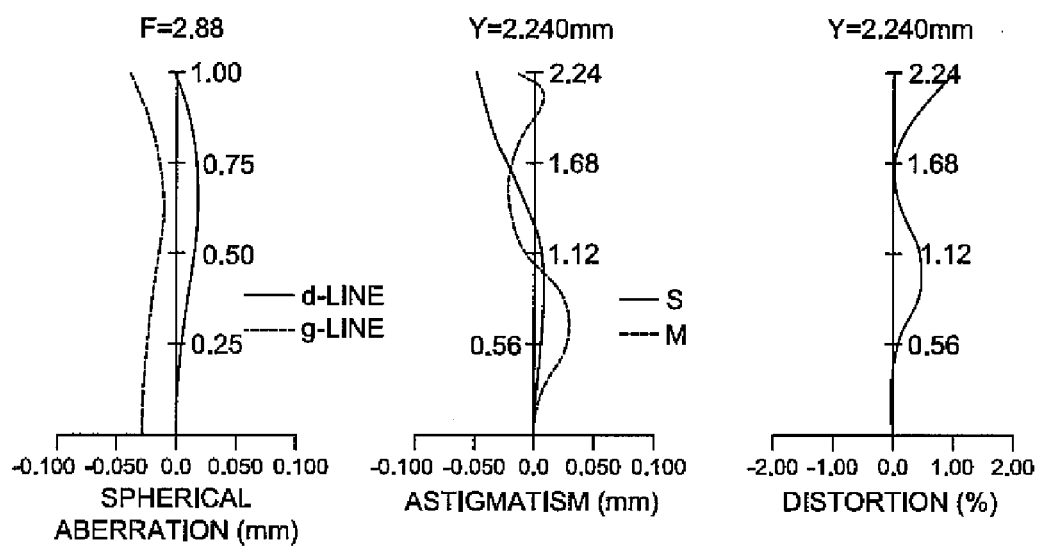
FIG. 16 (d)
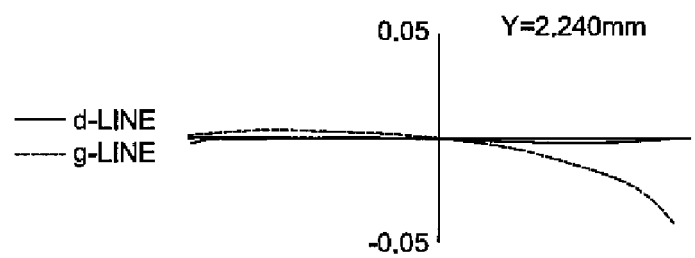
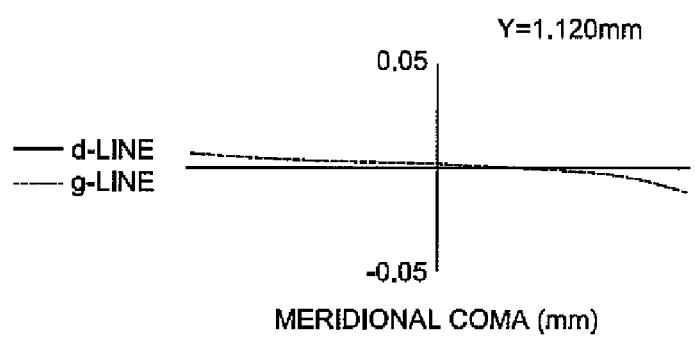

FIG. 18 (a)  FIG. 18 (b)  FIG. 18 (c)
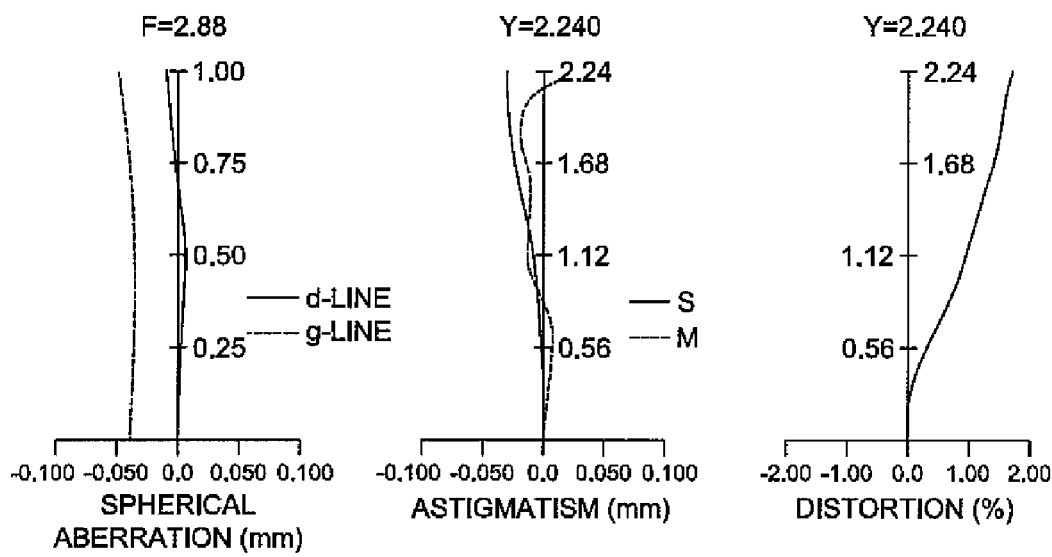
FIG. 18 (d)
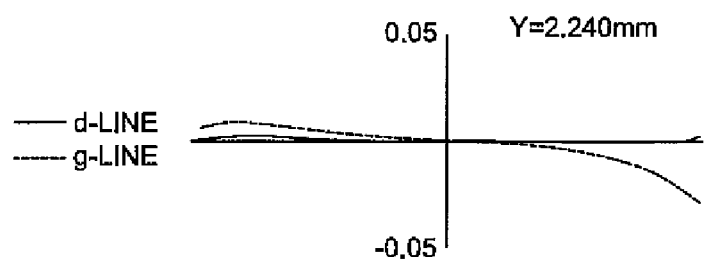
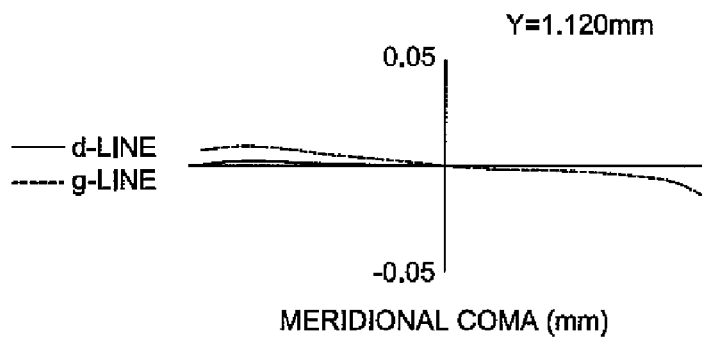

FIG. 20 (a)   FIG. 20 (b)   FIG. 20 (c)
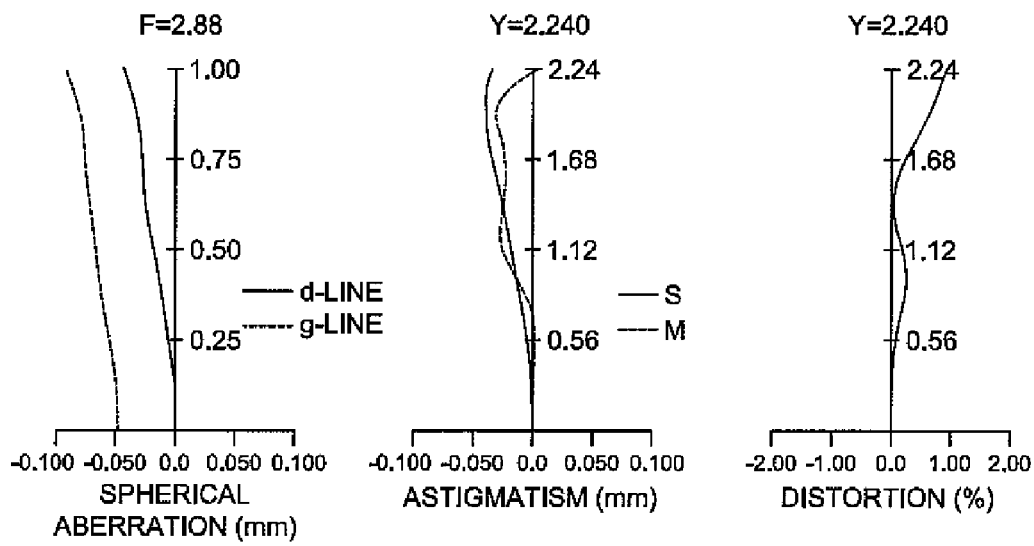
FIG. 20 (d)
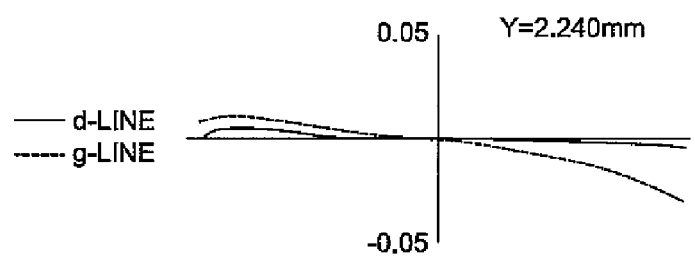
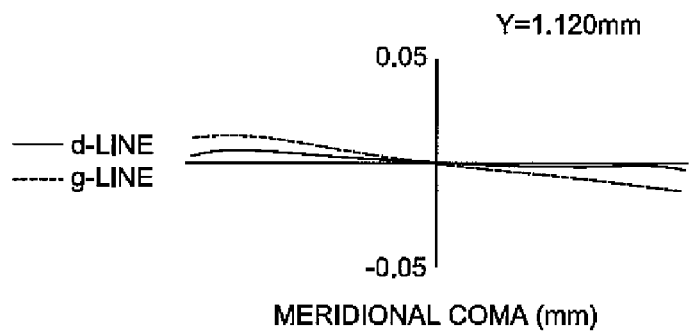

US 8,130,455 B2

IMAGE PICKUP LENS, IMAGE PICKUP UNIT, AND MOBILE TERMINAL

This application is based on Japanese Patent Application No. 2008-133125 filed on May 21, 2008, in Japanese Patent Office, the entire content of which is hereby incorporated by reference.

TECHNICAL FIELD

The present invention relates to a small-sized image pickup lens employing a solid-state image pickup element such as a CCD type image sensor or a CMOS type image sensor, and to an image pickup unit and a mobile terminal equipped with the image pickup lens.

BACKGROUND

A cell-phone and a mobile information terminal each being equipped with an image pickup apparatus are coming into wide use, with a trend of enhancing performance and downsizing of an image pickup apparatus using a solid-state image pickup element such as a CCD (Charged Coupled Device) type image sensor or a CMOS (Complementary Metal Oxide Semiconductor) type image sensor. Furthermore, there are increasing demands for further downsizing for the image pickup lens that is mounted on the image pickup apparatus of this kind.

As an image pickup lens to be used for this purpose, there has been proposed an image pickup lens composed of four elements, because it can provide higher property than a lens composed of two elements or three elements. As an example of the image pickup lens composed of four elements, there has been disclosed a so-called image pickup lens of an inverted Ernostar type that is made up of the first lens having positive refractive power, the second lens having negative refractive power, the third lens having positive refractive power and of the fourth lens having positive refractive power, in this order from the object side, for providing higher property, as described in, for example, Unexamined Japanese Patent Application Publication (JP-A) No. 2004-341013.

As another example of the image pickup lens composed of four elements, there has been proposed a so-called image pickup lens of a telephoto type that is made up of the first lens having positive refractive power, the second lens having negative refractive power, the third lens having positive refractive power and of the fourth lens having negative refractive power in this order from the object side, and is targeted to be shorten the total length of the image pickup lens, as described in, for example, JP-A No. 2002-365530.

The image pickup lens described in JP-A No. 2004-341013 is of an inverted Ernostar type in which the fourth lens is a positive lens. A principal point of the optical system is positioned on the image side and a length of its back focal length is longer, compared with a telephoto type lens in which the fourth lens is a negative lens. Therefore, this type of image pickup lens is disadvantageous to be downsized. In addition, there is one lens with a negative refractive power out of the four lenses in the optical system, which makes the correction of Petzval's sum difficult, resulting in a problem that excellent performance is hardly secured on a peripheral portion of an image. Further, in the image pickup lens described in JP-A No. 2002-365530, its angle of view is narrow and aberration correction is insufficient. It causes a problem that the image pickup lens hardly copes with a higher-pixel image pickup element due to the deterioration of its optical property when the total lens length is further shortened.

SUMMARY

In view of the aforesaid problems, there is provided an image pickup lens with four elements wherein various aberrations are properly corrected in spite of its size that is smaller than a conventional type, and further provided an image pickup unit and a mobile terminal equipped with the aforesaid image pickup lens.

An image pickup lens relating to the present invention is provided for forming an image of an object on a photoelectrical converter of a solid-state image pickup element. The image pickup lens comprises, in order from an object side thereof: a first lens in a meniscus shape having a positive refractive power and comprising a convex surface facing the object side; a second lens having a negative refractive power and comprising a concave surface facing an image side of the image pickup lens; a third lens in a meniscus shape having a positive refractive power and comprising a convex surface facing the image side; and a fourth lens having a negative refractive power and comprising a concave surface facing the image side, where at least one surface of the fourth lens is in an aspheric shape. The image pickup lens satisfies the predetermined condition relating to a composite focal length of the first lens and the second lens, and a focal length of a total system of the image pickup lens.

These and other objects, features and advantages according to the present invention will become more apparent upon reading of the following detailed description along with the accompanied drawings.

BRIEF DESCRIPTION OF DRAWINGS

Embodiments will now be described, by way of example only, with reference to the accompanying drawings which are meant to be exemplary, not limiting, and wherein like elements numbered alike in several Figures, in which:

FIGS. 6($a$) through 6($d$) show aberration diagrams in Example 1 including spherical aberration, astigmatism, distortion, and meridional coma, respectively;

FIG. 8($a$) through FIG. 8($d$) show aberration diagrams in Example 2 including spherical aberration, astigmatism, distortion, and meridional coma, respectively;

FIG. 10($a$) through FIG. 10($d$) show aberration diagrams in Example 3 including spherical aberration, astigmatism, distortion, and meridional coma, respectively;

FIG. 12(a) through FIG. 12(d) show aberration diagrams in Example 4 including spherical aberration, astigmatism, distortion, and meridional coma, respectively;

FIGS. 14(a) through 14(d) show aberration diagrams in Example 5 including spherical aberration, astigmatism, distortion, and meridional coma, respectively;

FIGS. 16(a) through 16(d) show aberration diagrams in Example 6 including spherical aberration, astigmatism, distortion, and meridional coma, respectively;

FIGS. 18(a) through 18(d) show aberration diagrams in Example 7 including spherical aberration, astigmatism, distortion, and meridional coma, respectively;

FIGS. 20(a) through 20(d) show aberration diagrams in Example 8 including spherical aberration, astigmatism, distortion, and meridional coma, respectively.

DESCRIPTION OF EMBODIMENTS

Figure 1:
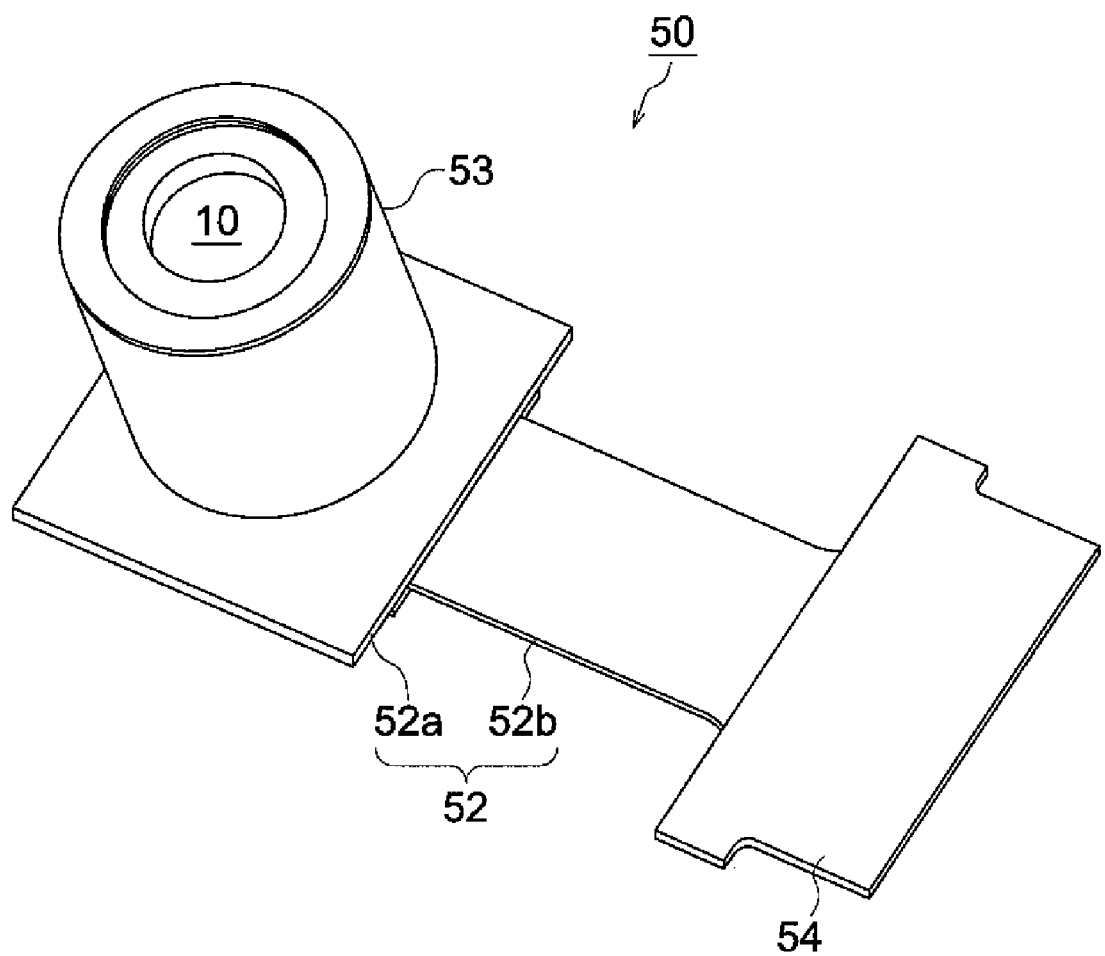
FIG. 1 is a perspective view of image pickup unit 50 relating to the embodiment of the invention.

Embodiments of the invention will be explained as follows.

One of the embodiments is an image pickup lens for forming an image of an object on a photoelectrical converter of a solid-state image pickup element. The image pickup lens comprises, in order from an object side thereof: a first lens in a meniscus shape having a positive refractive power and comprising a convex surface facing the object side; a second lens having a negative refractive power and comprising a concave surface facing an image side of the image pickup lens; a third lens in a meniscus shape having a positive refractive power and comprising a convex surface facing the image side; and a fourth lens having a negative refractive power and comprising a concave surface facing the image side, where at least one surface of the fourth lens being in an aspheric shape. The image pickup lens satisfies the following expression.

$$1.10 < f12/f < 1.75 \quad (1)$$

In the expression, f12 is a composite focal length of the first lens and the second lens, and f is a focal length of a total system of the image pickup lens.

A fundamental construction of the embodiment for obtaining a small-sized image pickup lens in which aberrations are properly corrected, is composed of the first meniscus-shaped lens having positive refractive power in which a convex surface faces the object side, the second lens having negative refractive power in which a concave surface faces the image side, the third meniscus-shaped lens having positive refractive power in which a convex surface faces the image side, and the fourth lens having negative refractive power, in this order from the object side. In the fourth lens, at least one surface is formed into an aspheric surface and a concave surface faces the image side. This lens construction is the so-called telephoto type, in which a positive lens group composed of the first lens, the second lens and the third lens, and of a negative fourth lens are arranged in this order from the object side. The construction is advantageous for downsizing in terms of a reduction of a total length of the image pickup lens.

As for a dimension of a small-sized image pickup lens, downsizing at the level satisfying the following expression is targeted. By satisfying this range, a small size and a light weight of the overall image pickup unit can be realized.

$$L/2Y < 1.10 \quad (5)$$

In this expression, L represents a distance along the optical axis from the lens surface closest to the object side to the focal point on the image side in the total image pickup lens system ("the focal point on the image side" means an image point formed when a parallel light beam that is in parallel with the optical axis enters the image pickup lens), and 2Y represents a length of a diagonal line of an image pickup surface of a solid-state image pickup element (a length of a diagonal line of a rectangular effective image pixel area of the solid-state image pickup element).

Meanwhile, when a parallel flat plate such as an optical lowpass filter, an infrared blocking filter or a seal glass of a solid-state image sensor package is arranged between the surface closest to the image side of the image pickup lens and the position of the focal point on the image side, the value of L mentioned above is required to be calculated under the condition that the space of the parallel flat plate is converted into an air distance. A range of the following expression is more preferable.

$$L/2Y < 1.00 \quad (5')$$

Furthermore, by forming two lenses in the four-element construction into negative lenses, it is possible to increase the number of surfaces with divergent action to correcting Petzval's sum easily, and is possible to obtain an image pickup lens wherein excellent image forming performance is secured up to the peripheral portion of the formed image. Further, by forming at least one surface of the fourth lens arranged to be closest to the image side into an aspheric shape, it is possible to properly correct various aberrations on the peripheral portions of the image.

In addition, by forming the first lens in a meniscus shape with a convex surface facing the object side, it is possible to arrange a position of the principal point to be more farther from an image pickup surface, thus, the telecentricity can easily be secured and the lens system has a structure which is advantageous to shorten the total length of the lens system. In addition, by forming the surface facing the image side of the second lens into a concave surface, it is possible to correct Petzval's sum easily. By forming the third lens into a meniscus shape whose convex surface faces the image side, it is possible to inhibit occurrence of f-axis aberration, because a light beam to travel toward the peripheral portion of an image pickup element, enters the surface facing the object side of the third lens at a small incident angle.

The expression (1) is a conditional expression for properly setting a composite focal length of the first lens and the second lens, and for properly realizing shortening of the total length of the image pickup lens and for properly realizing correction of aberrations. By making the value of f12/f to be lower than the upper limit of the expression (1) it is possible to properly maintain the positive composite focal length of the first lens and the second lens, and to achieve shortening of the total length of the lens system. On the other hand, when making the value of f12/f to be higher than the lower limit, the positive composite focal length of the first lens and the second lens does not become too large, and occurrence of high order spherical aberration and coma can be controlled. Further, the following expression (1') is more preferable and the following expression (1") is further more preferable.

$$1.15 < f12/f < 1.65 \quad (1')$$

$$1.15 < f12/f < 1.55 \quad (1'')$$

It is preferable that the above image pickup lens further comprises an aperture stop, wherein the aperture stop overlaps with at least a part of the surface of the first lens facing the object side, when viewing the image pickup lens in a direction perpendicular to an optical axis of the image pickup lens.

"The aperture stop overlaps with at least a part of the surface of the first lens facing the object side, when viewing the image pickup lens in a direction perpendicular to an optical axis of the image pickup lens" means the state that the first lens includes a convex surface facing the object side and the aperture stop is arranged at the position closer to the image side than the top of the convex surface facing the object side, and that the top of the convex surface facing the object side and its neighborhood (the surface around the optical axis) enters into the aperture stop. By arranging the aperture stop at the closer position to the image side than the top of the convex surface facing the object side, it is possible to make a refraction angle on the surface of the first lens facing the object side to be smaller. Thereby, occurrence of the high order spherical aberration and coma which are caused on the first lens can be controlled. It is further possible to lower the height of a beam that passes through the first lens, which makes it possible to easily secure an edge thickness of the first lens. On the other hand, under this construction, the aperture stop can be brought nearer to the image side as far as possible, which makes it possible to control the total length of the image pickup lens to be short.

It is preferable that the image pickup lens satisfies the following expression.

$$-3.0 < f2/f < -0.5 \quad (2)$$

In the expression, f2 is a focal length of the second lens.

The expression (2) is a conditional expression for properly setting a focal length of the second lens. By making a value of f2/f to be lower than the upper limit of the expression (2), negative refractive power of the second lens does not become too strong beyond necessity, and coma and distortion on the peripheral portion can be made small. On the other hand, by making the value of f2/f to be higher than the lower limit, it is possible to properly maintain the negative refractive power of the second lens, which is effective for reduction of Petzval' sum and correction of curvature of field. Further, the more preferable is in a range of the following expression.

$$-2.7 < f2/f < -0.8 \quad (2')$$

It is preferable that the image pickup lens satisfies the following expression.

$$10 < v2 < 31 \quad (3)$$

In the expression, v2 is an Abbe number of the second lens.

The expression (3) is a conditional expression for properly setting the Abbe number of the second lens, and for favorably correcting the chromatic aberration. By employing a material having relatively large dispersion for the negative second lens, chromatic aberration can be corrected properly, but an incident angle of a beam on the lens periphery grows greater and causes magnification chromatic aberration, because the surface facing the image side of the second lens is a strong diverging surface. In this case, if a value of v2 is lower than the lower limit of the expression (3), magnification chromatic aberration caused on a light flux on the lens periphery grows greater, though longitudinal chromatic aberration can be corrected sufficiently. On the other hand, if the value of v2 is higher than the upper limit, there is a fear that longitudinal chromatic aberration cannot be corrected completely, though magnification chromatic aberration caused on a light flux on the lens periphery can be controlled to be small. Therefore, it is preferable that the expression (3) is satisfied. Further, a range of the following expression is more preferable.

$$15 < v2 < 27 \quad (3')$$

It is preferable that the image pickup lens satisfies the following expression.

$$1.58 < n2 < 2.10 \quad (4)$$

In the expression, n2 is a refractive index of the second lens for d-line.

The expression (4) is a conditional expression for correcting chromatic aberration and curvature of field of the total system of the image pickup lens system properly. By making the value of n2 to be higher than the lower limit of the expression (4), it is possible to properly maintain the refractive power of the second lens having relatively large dispersion, whereby, chromatic aberration and curvature of field can be corrected favorably. On the other hand, when making the value of n2 to be lower than the upper limit, the second lens can be formed with glass materials which are easily available. Further, a range of the following expression is more preferable.

$$1.60 < n2 < 2.00 \quad (4')$$

In the above image pickup lens, it is preferable that the second lens is in a meniscus shape and comprises a convex surface facing the object side.

By forming the second lens in a meniscus shape including a convex surface facing the object side, curvature of field of the surface facing the object side of the second lens is corrected properly, and refractive power of the second lens does not grow to be stronger beyond necessity. Therefore, fluctuations of an image plane caused by misalignment in the course of manufacturing of the image pickup lens can be reduced, and a lens system with manufacture stability can be obtained.

In the image pickup lens, it is preferable that the surface of the fourth lens facing the image side is in an aspheric shape on which a center portion has a negative refractive power, and the negative refractive power becomes smaller at a position being farther from the center portion to a periphery, and that the surface of the fourth lens facing the image side includes an inflection point.

By forming the surface facing the image side of the fourth lens into an aspheric shape on which the negative refractive power becomes smaller at a position being farther from the optical axis to the periphery, and an inflection point is included, telecentricity of a light flux at the image side can be secured easily. Further, it does not require the surface facing the image side of the second lens to have negative refractive power that is excessively weak on the lens periphery portion, which makes it possible to correct off-axis aberration properly. In this case, "the inflection point" means a point on an aspheric surface such that a tangential plane on the point of the aspheric surface becomes perpendicular to the optical axis, on a curved line of the cross-sectional shape of the lens within its effective radius.

In the image pickup lens, it is preferable that the fourth lens is a bi-concave lens.

By forming the fourth lens arranged at the closest position to the image side into a bi-concave shape, the peripheral portion on the image side surface of the fourth lens does not greatly project toward the image plane, thus, it is possible to shorten a back focus with avoiding the lens from contacting with parallel flat plate such as an optical lowpass filter, an infrared blocking filter, or seal glass of solid state image sensor package and a substrate of a solid state image sensor to be arranged between the fourth lens and the solid state image sensor. It results in a constitution that is advantageous to shorten the total length of the image pickup lens.

In the image pickup lens, it is preferable that each of the first to fourth lenses is formed of a plastic material.

In recent years, under the purpose of downsizing of an overall solid-state image pickup apparatus, there has been developed a solid-state image pickup element with a smaller pixel pitch, resulting in a smaller size of an image pickup surface, compared with a solid-state image pickup element having the same number of pixels. In the image pickup lens for the solid-state image pickup element having a small size of the image pickup surface of this kind, a focal length of the total optical system is requested to be relatively short, which makes a curvature radius and the outside diameter of each lens to be small considerably. Therefore, when compared with a glass lens manufactured through time-consuming grinding processing, image pickup lenses in which all lenses are plastic lenses manufactured by injection molding can be mass-produced at low cost even if each lens has a small curvature radius and a small outside diameter. In addition, it is possible to control wear and tear of a molding die because press temperature can be made low in the case of a plastic lens, resulting in reduction of the number of times for replacement of molding dies and of the number of times for maintenance, which realizes cost reduction.

Another embodiment of the present invention is an image pickup unit comprising: the above image pickup lens. By using the image pickup lens representing the embodiment of the invention therein, the image pickup unit that is smaller in size and has higher property can be obtained.

Another embodiment of the present invention is a mobile terminal comprising the above image pickup unit. By using the image pickup unit representing the embodiment of the invention therein, the mobile terminal that is smaller in size and has higher property can be obtained.

The aforesaid embodiment makes it possible to provide an image pickup lens with four elements in which various aberrations are properly corrected in spite of its size that is smaller than a conventional type, and to provide an image pickup unit and a mobile terminal which are equipped with the aforesaid image pickup lens.

Embodiments of the invention will be explained in detail as follows, referring to the drawings. FIG. 1 is a perspective view of image pickup unit 50 relating to the present embodiment, and FIG. 2 is a diagram schematically showing a cross-section of an image pickup optical system of the image pickup unit 50 along the optical axis.

As shown in FIG. 1, the image pickup unit 50 is equipped with CMOS type image sensor 51 representing a solid-state image pickup element having photoelectric conversion section 51a, image pickup lens 10 that forms an image of a photographic object on photoelectric conversion section 51a of the image sensor 51, substrate 52 that holds the image sensor 51 and has terminal for external connection 54 (that is also called external connection terminal) that transmits and receives electric signals, and casing 53 representing a lens barrel that has an aperture section for incidence of light from the photographic object side and is composed of a light shielding member, which are formed integrally.

Figure 2:
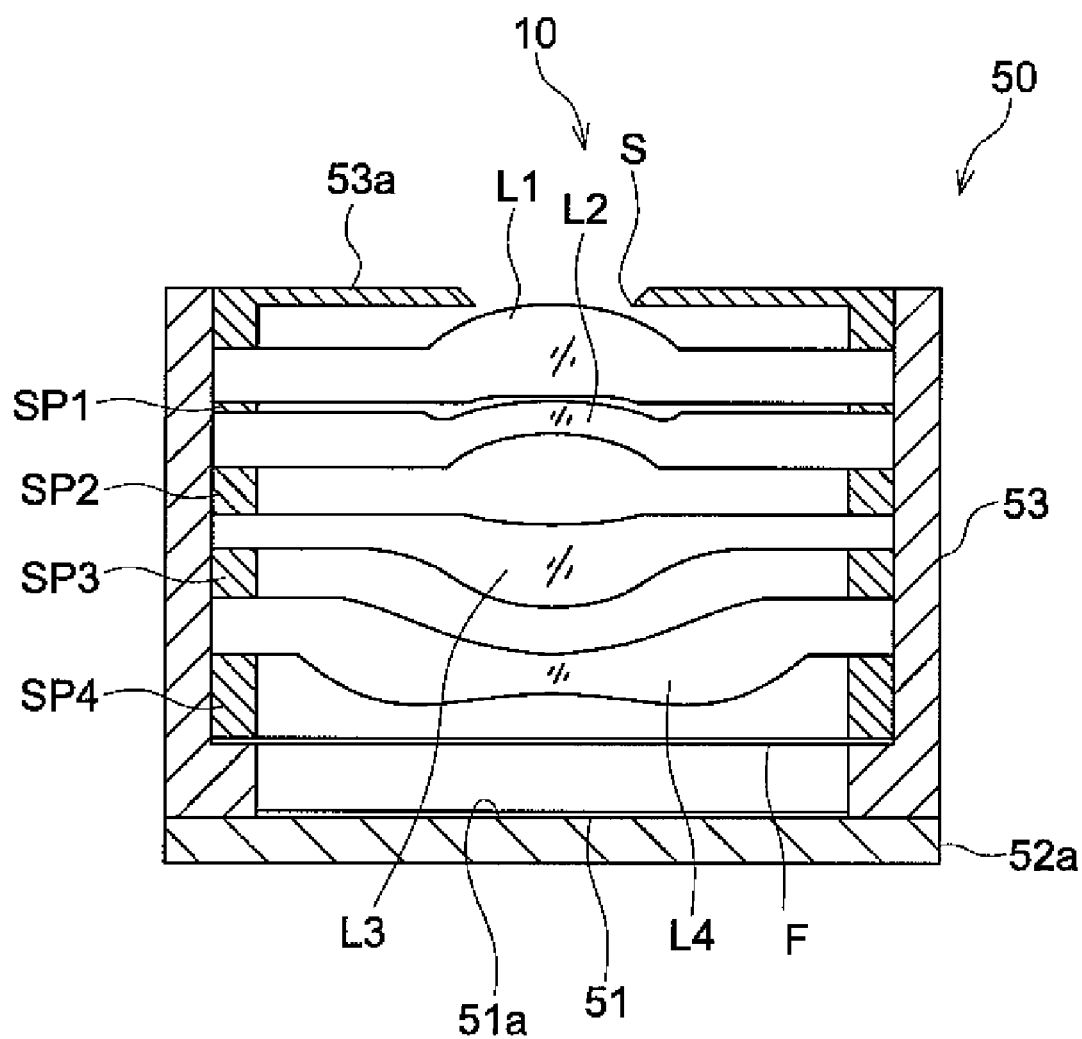
FIG. 2 is a diagram schematically showing a cross-section of image pickup unit 50 taken on a line of an optical axis of an image pickup optical system.

As is shown in FIG. 2, the photoelectric conversion section 51a serving as a light receiving section on which pixels (photoelectric conversion elements) are arranged on a two-dimensional basis, is formed at the central portion on a plane on the light receiving side of the image sensor 51, and signal processing circuits (unillustrated) are formed on the surroundings of the photoelectric conversion section 51a. The signal processing circuit of this kind is composed of a drive circuit section that drives each pixel in succession to obtain signal electric charges, A/D conversion section that converts each signal electric charge into a digital signal, and a signal processing section that forms image signal output by using this digital signal. Further, in the vicinity of the outer edge of the light-receiving-side plane of the image sensor 51 there are arranged many pads (not illustrated) which are connected to substrate 52 through wires W. The image sensor 51 converts signal electric charges coming from the photoelectric conversion section 51a into image signal such as digital YUV signal, and outputs it to prescribed circuits on substrate 52 through wires W. In this case, Y represents luminance signals, U (=R−Y) represents color difference signals between red and luminance signals and V (=B−Y) represents color difference signals between blue and luminance signals. In the mean time, the image sensor is not limited to the aforesaid CMOS type image sensor, and other ones such as CCD may also be used.

The substrate 52 is equipped with supporting flat plate 52a that supports thereon image sensor 51 and casing 53 and with flexible substrate 52b whose one end portion is connected to the bottom surface (surface on the opposite side of image sensor 51) of the supporting flat plate 52a.

The supporting flat plate 52a has thereon many pads for signal transmission, and is connected to image sensor 51 through unillustrated wires, which is not illustrated.

In FIG. 1, the flexible substrate 52b has one end portion which is connected to supporting flat plate 52a and the flexible substrate 52b connects the supporting flat plate 52a to an outer circuit (for example, a control circuit owned by an upper level apparatus equipped with an image pickup unit) through external connection terminal 54 that is provided on the other end portion. It enables the flexible substrate 52b to be applied a voltage and receive clock signals for driving image sensor 51 from outer circuits, and to output digital YUV signals to the outer circuits. Further, the flexible substrate 52b has flexibility or deformation property on its intermediate section in its longitudinal direction. The deformation gives the supporting flat plate 52a a degree of freedom in terms of a direction and arrangement of external connection terminal 54.

In FIG. 2, image sensor 51 is provided on the supporting flat plate 52a of the substrate 52, and casing 53 is fixed on the surface where image sensor 51 is provided so as to cover the image sensor 51. Namely, the casing 53 has a large opening on the image sensor 51 side, and the casing 53 extends so as to surround the image sensor 51. Further, flange portion 53a having a small aperture is formed on the other end portion of the casing 53 (end portion on the object side), and the end portion on the image sensor 51 side (end portion on the image side) is in contact with the supporting flat plate 52a to be fixed. The end portion of casing 53 on the image sensor 51 side may also be in contact with an area surrounding the photoelectric conversion section 51a on the image sensor 51 to be fixed.

In casing 53, flange section 53a on which a small opening (aperture section for light incidence) is arranged to face the object side. In the inside of the casing 53, IR (infrared rays) blocking filter F is arranged to be fixed between image pickup lens 10 and image sensor 51.

In the order from the object side, the image pickup lens 10 includes therein aperture stop S composed of a small aperture on flange section 53a, positive first lens L1 whose convex surface faces the object side, meniscus-shaped negative second lens L2 whose convex surface faces the object side and a concave surface faces the image side, meniscus-shaped positive third lens L3 whose convex surface faces the image side, and of negative fourth lens L4 whose concave surface faces the image side. The image pickup lens has a function to form an image of a photographic object on an image sensor. It is preferable that the surface facing the image side of the fourth lens L4 is formed as an aspheric surface, and its center has negative refractive power which becomes gradually weaker toward the lens periphery, and it includes an inflection point. It is preferable that all lenses L1 to L4 are made of plastic. In the meantime, in FIGS. 1 and 2, an upper side is assumed to be the object side, and a lower side is assumed to be the image side.

An external light shielding mask may also be arranged at a position closer to the object side than the first lens L1 for minimizing incidence of unwanted light coming from the outside. Further, aperture stop S is a member to determine an f-number of the total system of an image pickup lens.

Lenses L1 through L4 and IR blocking filter F are arranged at prescribed intervals with spacers SP1 through SP4 arranged between flanges of adjacent lenses. The IR blocking filter F is a member formed, for example, to be in a rectangular form or a circular form.

Figure 3:
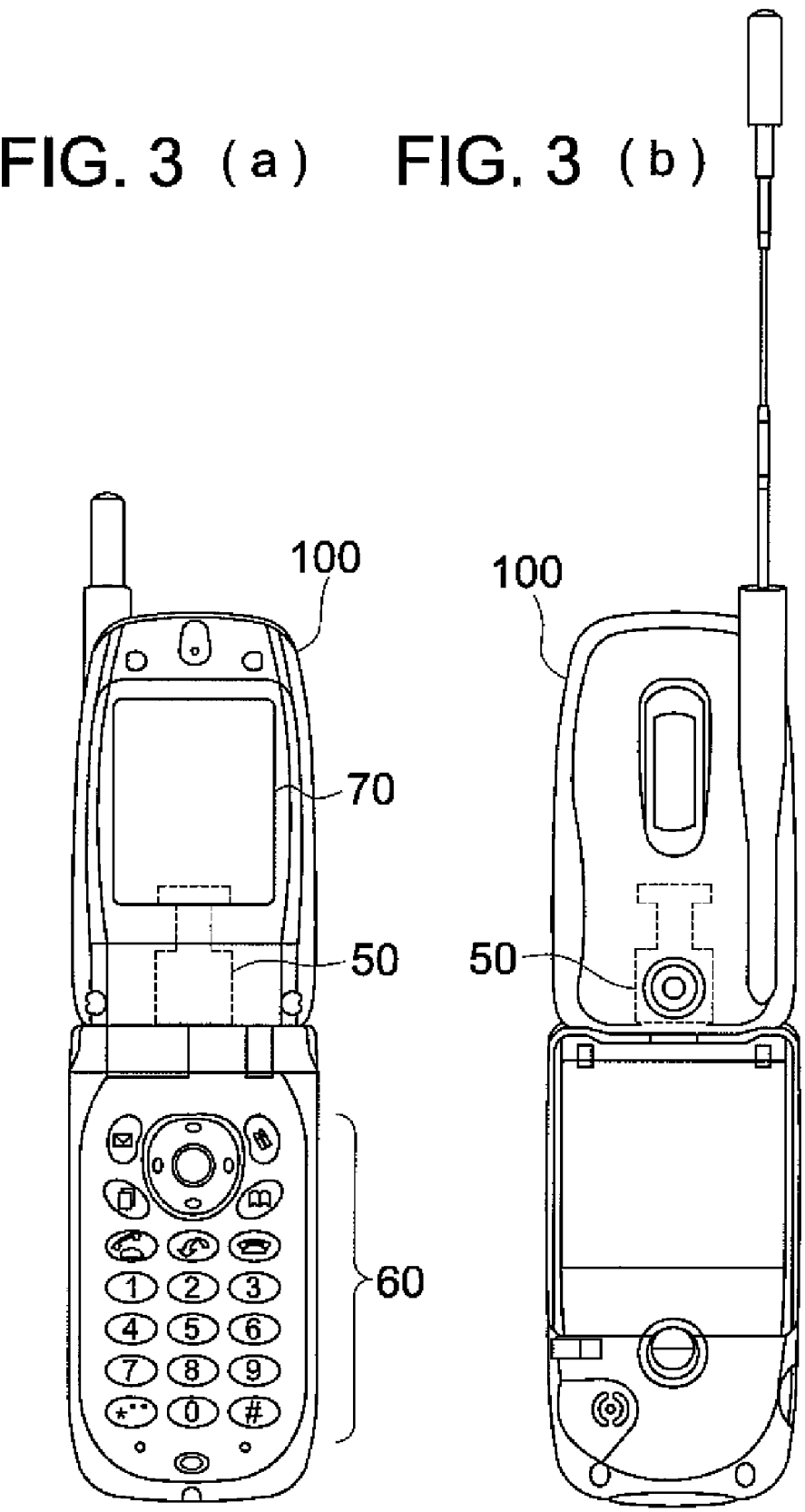
FIG. 3($a$) is a front view of a cell-phone to which an image pickup unit is applied, and FIG. 3($b$) is a rear view of a cell-phone on which an image pickup unit is applied.

Operations of the aforesaid image pickup unit 50 will be explained. Each of FIGS. 3(a) and 3(b) shows how the image pickup unit 50 is installed in cellphone 100 as a mobile terminal or an image pickup unit. Further, FIG. 4 is a block diagram of the cellphone 100.

The image pickup unit 50 is arranged at a position corresponding to the lower portion of a liquid crystal display section in the cellphone 100, so that the end surface of casing 53 on the object side faces the rear of the cellphone 100 (see FIG. 3(b)).

External connecting terminal 54 (represented as an arrow mark in FIG. 4) of the image pickup unit 50 is connected to the control section 101 of the mobile phone 100, and the image signal such as the brightness signal or the color difference signal is outputted to the control section 101.

Figure 4:
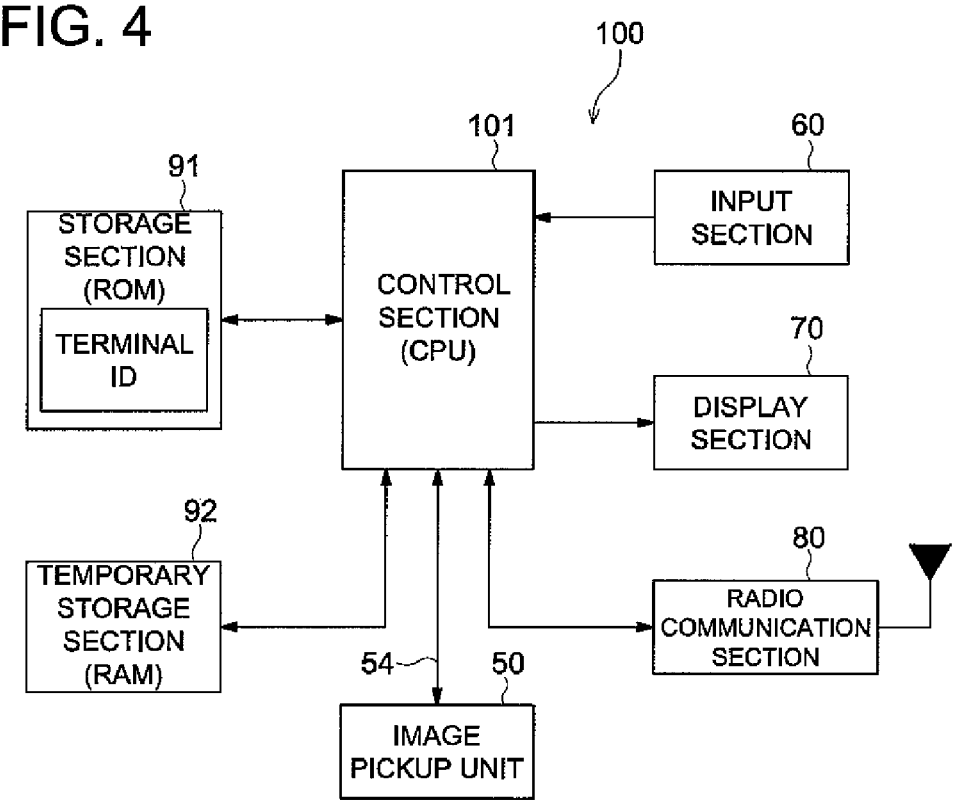
FIG. 4 is a control block diagram of a cell-phone shown in FIG. 3($a$) and FIG. 3($b$)

On the one hand, as shown in FIG. 4, the mobile phone 100 is provided with: a control section (CPU) 101 which generally controls each section and executes the program corresponding to each processing, input section 60 which is an input section for indicating and inputting the number, liquid crystal display section 70 that displays images taken in addition to prescribed data, a wireless communication section 80 for realizing an each kind of information communication to the external server, a storage section (ROM) 91 which stores the data necessary for the system program of the mobile phone 100 or each kind of processing program or terminal ID, and a temporary storage section (RAM) 92 which temporarily stores each kind of processing program or data or processing data processed by the control section 101, the image data by the image pickup unit 50, or is used as a working area.

Further, the image signal inputted from the image pickup unit 50 is stored in the storage section 91 by the control section 101 of the mobile phone 100, is displayed on the display section 70, and further is transmitted to the outside as the image information through the wireless communication section 80.

EXAMPLES

Examples of image pickup lenses applied to the aforesaid embodiments will be shown below. The following symbols are used in the respective examples.
 f: Focal length of the total system of the image pickup lens
 fB: Back focus
 F: F-number
 2Y: Diagonal length of image pickup surface of solid-state image pickup element (Diagonal length on rectangular effective pixel area of solid-state image pickup element)
 ENTP: Entrance pupil position (Distance from the first surface to entrance pupil position)
 EXTP: Emergence pupil position (Distance from image plane to the emergence pupil position)
 H1: Front side principal point position (Distance from the first surface to front side principal point position)
 H2: Rear side principal point position (Distance from the last surface to rear side principal point position)
 R: Curvature radius of refractive surface
 D: Surface distance on the optical axis
 Nd: Refractive index of lens material at normal temperature for d-line
 vd: Abbe number of lens material In each Example, the asterisk (*) following each surface number means an aspheric surface and the shape of the aspheric surface is expressed by the following expression (6), where X-axis extends along the optical axis direction, the top of the surface is on the origin, and the height perpendicular to the optical axis is h.

$$X = \frac{h^2/R}{1+\sqrt{1-(1+K)h^2/R^2}} + \sum A_i h^i \tag{6}$$

In the aforesaid expression, $A_i$ represents $i^{th}$ order aspheric surface coefficient, R represents a curvature radius and K represents a conic constant.

In the following description (including lens data in Tables), an exponent for 10 is assumed to be expressed by using E (for example, $2.5 \times 10^{-02}$ is expressed by 2.5E-02). Further, surface numbers in lens data are numbered by assuming the surface of the first lens facing the object as the first surface. Incidentally, each of all units of numerical values indicating lengths described in the Examples is mm.

Example 1

Lens data of an image pickup lens in Example 1 is shown in the following Table 1.

TABLE 1

Example 1
f = 5.64 mm  fB = 0.92 mm  F = 2.88  2Y = 7.128 mm
ENTP = 0 mm  EXTP = −3.29 mm  H1 = −1.91 mm  H2 = −4.72 mm

| Surface No. | R (mm) | D (mm) | Nd | vd | Effective radius (mm) |
|---|---|---|---|---|---|
| 1 (stop) | ∞ | −0.06 | | | 0.98 |
| 2* | 2.382 | 1.19 | 1.5447 | 56.2 | 1.08 |
| 3* | 96.254 | 0.05 | | | 1.20 |
| 4* | 4.556 | 0.40 | 1.6320 | 23.4 | 1.26 |
| 5* | 2.262 | 1.12 | | | 1.29 |
| 6* | −10.912 | 1.12 | 1.5447 | 56.2 | 2.05 |
| 7* | −1.535 | 0.52 | | | 2.31 |
| 8* | −4.671 | 0.50 | 1.5447 | 56.2 | 2.73 |
| 9* | 2.380 | 0.60 | | | 3.17 |
| 10 | ∞ | 0.10 | 1.5163 | 64.1 | 3.61 |
| 11 | ∞ | | | | 3.63 |

Aspheric surface coefficient $2^{nd}$ surface

K = 0.17727E+00
A4 = −0.15210E−02
A6 = 0.11019E−02
A8 = −0.36848E−03
A10 = 0.50447E−04

$3^{rd}$ surface

K = 0.23707E+02
A4 = 0.15978E−01
A6 = 0.95396E−02

TABLE 1-continued

Example 1
f = 5.64 mm fB = 0.92 mm F = 2.88 2Y = 7.128 mm
ENTP = 0 mm EXTP = −3.29 mm H1 = −1.91 mm H2 = −4.72 mm A8 = 0.17697E−02
A10 = −0.14449E−02
4$^{th}$ surface K = 0.52585E+01
A4 = −0.16581E−01
A6 = 0.11304E−01
A8 = −0.31459E−02
A10 = 0.50945E−02
A12 = −0.24661E−02
5$^{th}$ surface K = −0.16756E+01
A4 = 0.30202E−02
A6 = 0.82746E−02
A8 = −0.73739E−02
A10 = 0.94336E−02
A12 = −0.30790E−02
6$^{th}$ surface K = 0.25783E+02
A4 = 0.36215E−02
A6 = 0.33843E−02
A8 = −0.61578E−03
A10 = 0.92169E−04
A12 = 0.15509E−06
7$^{th}$ surface K = −0.40596E+01
A4 = −0.32417E−01
A6 = 0.14084E−01
A8 = −0.19511E−02
A10 = 0.30088E−03
A12 = −0.34822E−04
8$^{th}$ surface K = −0.11045E+01
A4 = −0.23174E−01
A6 = 0.81874E−02
A8 = −0.40379E−03
A10 = −0.19184E−03
A12 = 0.37065E−04
A14 = −0.20832E−05
9$^{th}$ surface K = −0.15709E+02
A4 = −0.30476E−01
A6 = 0.61260E−02
A8 = −0.80434E−03
A10 = 0.54700E−04
A12 = −0.18185E−05
A14 = 0.20040E−07

Data of each single lens

| Lens No. | Front surface No. | Focal length (mm) |
|---|---|---|
| 1 | 2 | 4.463 |
| 2 | 4 | −7.620 |
| 3 | 6 | 3.146 |
| 4 | 8 | −2.824 |

Figure 5:
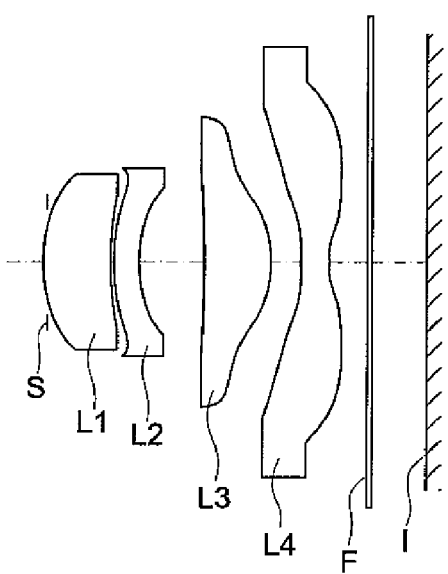
FIG. 5 is a sectional view in the direction of optical axis of the image pickup lens in Example 1.

FIG. 5 is a cross-sectional view of a lens in Example 1 and shows the first lens L1, the second lens L2, the third lens L3, the fourth lens L4, aperture stop S and image pickup surface I. Further, F represents a parallel flat plate assuming an optical lowpass filter, an IR blocking filter and a seal glass of a solid state image sensor. FIGS. 6(a)-6(d) are diagrams of aberrations (spherical aberration, astigmatism, distortion and meridional coma, respectively) of Example 1. In the following diagrams of aberrations, solid lines correspond to d-line and dotted lines correspond to g-line in the diagram of spherical aberration, while, solid lines correspond to suggital image surface and dotted lines correspond to a meridional image surface in the diagram of astigmatism. In the present Example, all lenses are made with plastic materials, and aperture stop S overlaps with the surface facing the image side of the first lens L1, when it is viewed in the direction perpendicular to the optical axis.

Example 2

Lens data of an image pickup lens in Example 2 is shown in the following Table 2.

TABLE 2

Example 2
f = 5.64 mm fB = 0.93 mm F = 2.88 2Y = 7.128 mm
ENTP = 0 mm EXTP = −3.51 mm H1 = −1.52 mm H2 = −4.71 mm

| Surface No. | R (mm) | D (mm) | Nd | νd | Effective radius (mm) |
|---|---|---|---|---|---|
| 1 (stop) | ∞ | −0.15 | | | 0.98 |
| 2* | 2.175 | 0.97 | 1.5318 | 56.0 | 1.03 |
| 3* | 122.649 | 0.12 | | | 1.09 |
| 4* | 6.340 | 0.40 | 1.5830 | 30.0 | 1.14 |
| 5* | 2.157 | 1.21 | | | 1.23 |
| 6* | −26.733 | 1.39 | 1.5318 | 56.0 | 1.99 |
| 7* | −1.546 | 0.48 | | | 2.31 |
| 8* | −9.606 | 0.50 | 1.5318 | 56.0 | 3.01 |
| 9* | 1.896 | 0.60 | | | 3.35 |
| 10 | ∞ | 0.10 | 1.5163 | 64.1 | 3.43 |
| 11 | ∞ | | | | 3.45 |

Aspheric surface coefficient

2$^{nd}$ surface

K = 0.43699E+00
A4 = −0.35815E−03
A6 = 0.16135E−02
A8 = 0.15027E−02
A10 = 0.15586E−03
3$^{rd}$ surface K = 0.30000E+02
A4 = 0.11786E−01
A6 = 0.17135E−01
A8 = 0.94718E−02
A10 = −0.26634E−02
4$^{th}$ surface K = 0.74875E+01
A4 = −0.44145E−01
A6 = 0.29419E−01
A8 = −0.49250E−02
A10 = 0.64643E−02
A12 = −0.44251E−02
5$^{th}$ surface K = −0.26561E+01
A4 = −0.59955E−02
A6 = 0.17370E−01
A8 = −0.60136E−02
A10 = 0.44566E−02
A12 = −0.17748E−02
6$^{th}$ surface K = −0.30000E+02
A4 = −0.67686E−02
A6 = 0.17809E−02
A8 = −0.16667E−03
A10 = 0.55864E−04
A12 = −0.21948E−04
7$^{th}$ surface

K = −0.43289E+01
A4 = −0.32933E−01
A6 = 0.10621E−01
A8 = −0.16646E−02

TABLE 2-continued

Example 2
f = 5.64 mm fB = 0.93 mm F = 2.88 2Y = 7.128 mm
ENTP = 0 mm EXTP = −3.51 mm H1 = −1.52 mm H2 = −4.71 mm

A10 = 0.31212E−03
A12 = −0.37925E−04

$8^{th}$ surface

K = 0.45872E+01
A4 = −0.23064E−01
A6 = 0.75487E−02
A8 = −0.38380E−03
A10 = −0.82178E−04
A12 = 0.12549E−04
A14 = −0.53340E−06

$9^{th}$ surface

K = −0.91691E+01
A4 = −0.22993E−01
A6 = 0.46131E−02
A8 = −0.63951E−03
A10 = 0.59737E−04
A12 = −0.27859E−05
A14 = 0.36304E−07

Data of each single lens

| Lens No. | Front surface NO. | Focal length (mm) |
|---|---|---|
| 1 | 2 | 4.153 |
| 2 | 4 | −5.811 |
| 3 | 6 | 3.027 |
| 4 | 8 | −2.934 |

Figure 7:
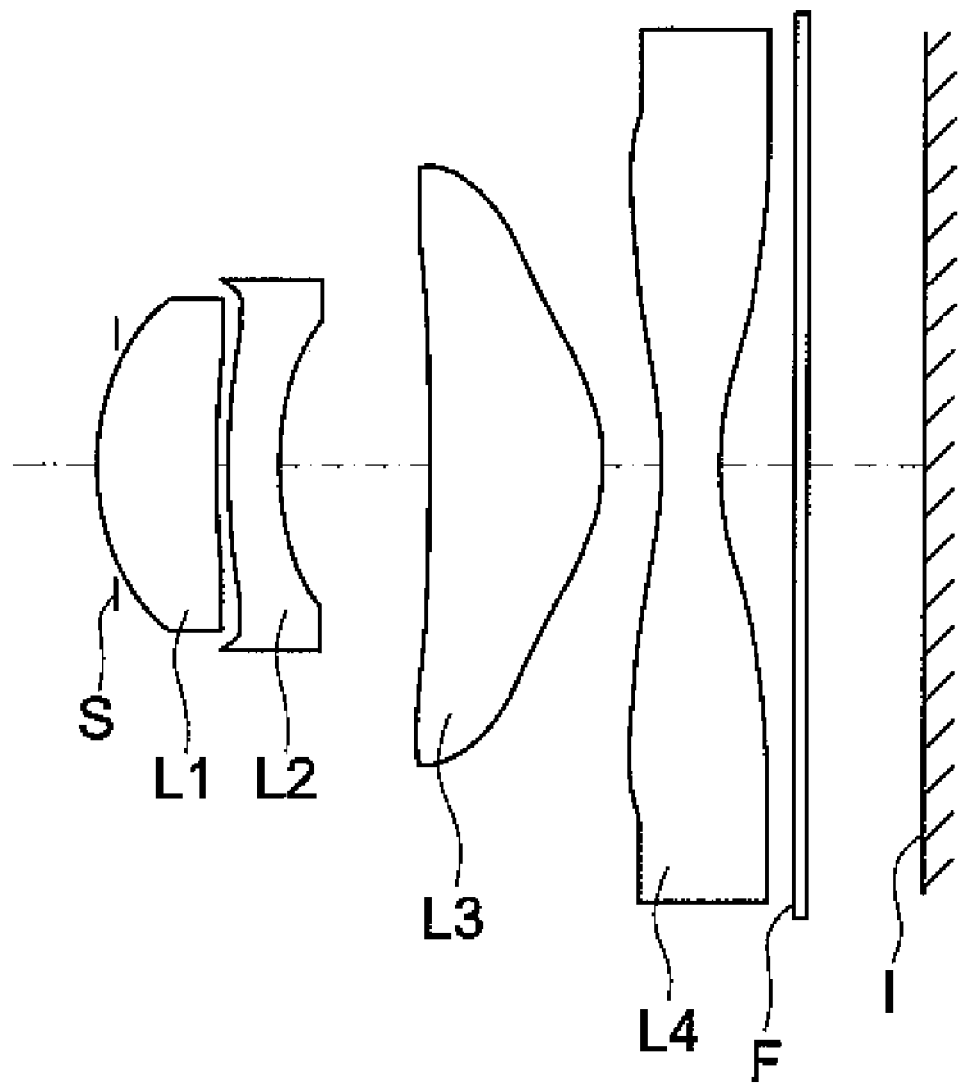
FIG. 7 is a sectional view in the direction of optical axis of the image pickup lens in Example 2.

FIG. 7 is a cross-sectional view of the image pickup lens shown in Example 2. FIG. 7 shows the first lens L1, the second lens L2, the third lens L3, the fourth lens L4, aperture stop S and image pickup surface I. Further, F represents a parallel flat plate assuming an optical lowpass filter, an IR blocking filter and a seal glass of a solid state image sensor FIGS. 8(a)-8(d) are diagrams of aberrations (spherical aberration, astigmatism, distortion and meridional coma, respectively) of Example 2. In the present Example, all lenses are made with plastic materials, and aperture stop S overlaps with the surface facing the image side of the first lens L1, when it is viewed in the direction perpendicular to the optical axis.

Example 3

Lens data of an image pickup lens in Example 3 is shown in the following Table 3.

TABLE 3

Example 3
f = 3.56 mm fB = 0.32 mm F = 2.88 2Y = 4.48 mm
ENTP = 0 mm EXTP = −2.31 mm H1 = −1.26 mm H2 = −3.24 mm

| Surface No. | R (mm) | D (mm) | Nd | vd | Effective radius (mm) |
|---|---|---|---|---|---|
| 1 (stop) | ∞ | −0.05 | | | 0.62 |
| 2* | 1.403 | 0.49 | 1.5447 | 56.2 | 0.66 |
| 3* | 20.331 | 0.11 | | | 0.68 |
| 4* | 4.497 | 0.37 | 1.6320 | 23.4 | 0.72 |
| 5* | 1.748 | 0.70 | | | 0.74 |
| 6* | −7.515 | 0.70 | 1.5447 | 56.2 | 1.17 |
| 7* | −1.050 | 0.27 | | | 1.38 |
| 8* | −4.180 | 0.40 | 1.5447 | 56.2 | 1.76 |
| 9* | 1.449 | 0.60 | | | 1.98 |
| 10 | ∞ | 0.10 | 1.5163 | 64.1 | 2.25 |
| 11 | ∞ | | | | 2.27 |

TABLE 3-continued

Example 3
f = 3.56 mm fB = 0.32 mm F = 2.88 2Y = 4.48 mm
ENTP = 0 mm EXTP = −2.31 mm H1 = −1.26 mm H2 = −3.24 mm Aspheric surface coefficient $2^{nd}$ surface K = 0.25074E+00
A4 = −0.16183E−01
A6 = −0.17429E−02
A8 = 0.23863E−01
A10 = 0.76253E−01

$3^{rd}$ surface

K = 0.30000E+02
A4 = −0.54859E−01
A6 = 0.15353E+00
A8 = 0.20628E+00
A10 = −0.24294E−01

$4^{th}$ surface

K = 0.16830E+02
A4 = −0.12954E+00
A6 = 0.21923E+00
A8 = −0.34348E−01
A10 = 0.43370E+00
A12 = −0.59055E+00

$5^{th}$ surface

K = −0.89671E+00
A4 = 0.56806E−02
A6 = 0.11394E+00
A8 = −0.56858E−01
A10 = 0.36107E+00
A12 = −0.32832E+00

$6^{th}$ surface

K = 0.53961E+01
A4 = −0.68512E−02
A6 = 0.12358E−01
A8 = −0.18069E−01
A10 = 0.12878E−02
A12 = 0.46095E−02

$7^{th}$ surface

K = −0.42635E+01
A4 = −0.93423E−01
A6 = 0.99836E−01
A8 = −0.35862E−01
A10 = 0.13744E−01
A12 = −0.35524E−02

$8^{th}$ surface

K = 0.21597E+01
A4 = −0.94160E−01
A6 = 0.66952E−01
A8 = −0.72134E−02
A10 = −0.39864E−02
A12 = 0.13986E−02
A14 = −0.14049E−03

$9^{th}$ surface

K = −0.12177E+02
A4 = −0.11131E+00
A6 = 0.45109E−01
A8 = −0.14685E−01
A10 = 0.28257E−02
A12 = −0.31266E−03
A14 = 0.17147E−04

Data of each single lens

| Lens No. | Front surface No. | Focal length (mm) |
|---|---|---|
| 1 | 2 | 2.741 |
| 2 | 4 | −4.775 |

TABLE 3-continued

Example 3
f = 3.56 mm fB = 0.32 mm F = 2.88 2Y = 4.48 mm
ENTP = 0 mm EXTP = −2.31 mm H1 = −1.26 mm H2 = −3.24 mm

| 3 | 6 | 2.159 |
|---|---|-------|
| 4 | 8 | −1.927 |

Figure 9:
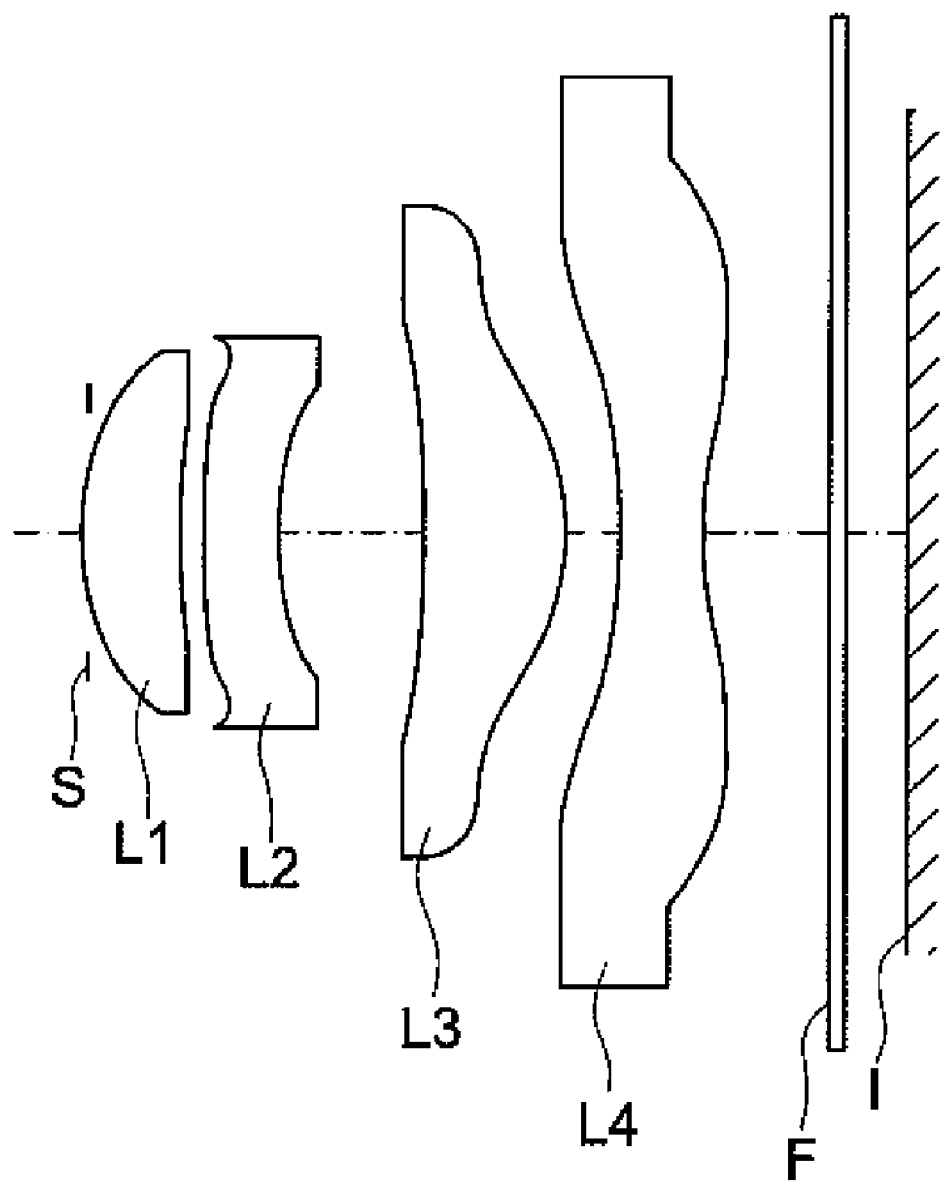
FIG. 9 is a sectional view in the direction of optical axis of the image pickup lens in Example 3.

FIG. 9 is a cross-sectional view of the image pickup lens shown in Example 3. FIG. 9 shows the first lens L1, the second lens L2, the third lens L3, the fourth lens L4, aperture stop S and image pickup surface I. Further, F represents a parallel flat plate assuming an optical lowpass filter, an IR blocking filter and a seal glass of a solid state image sensor. FIGS. 10(a)-10(d) are diagrams of aberrations (spherical aberration, astigmatism, distortion and meridional coma, respectively) of Example 3. In the present Example, all lenses are made with plastic materials, and aperture stop S overlaps with the surface facing the image side of the first lens L1, when it is viewed in the direction perpendicular to the optical axis.

Example 4

Lens data of an image pickup lens in Example 4 is shown in the following Table 4.

TABLE 4

Example 4
f = 3.57 mm fB = 0.21 mm F = 2.4 2Y = 4.48 mm
ENTP = 0 mm EXTP = −2.41 mm H1 = −1.3 mm H2 = −3.36 mm

| Surface No. | R (mm) | D (mm) | Nd | νd | Effective radius (mm) |
|---|---|---|---|---|---|
| 1 (stop) | ∞ | −0.10 | | | 0.74 |
| 2* | 1.543 | 0.69 | 1.5447 | 56.2 | 0.79 |
| 3* | 80.645 | 0.11 | | | 0.82 |
| 4* | 5.054 | 0.37 | 1.6320 | 23.4 | 0.87 |
| 5* | 1.793 | 0.58 | | | 0.89 |
| 6* | −14.858 | 0.81 | 1.5447 | 56.2 | 1.16 |
| 7* | −1.218 | 0.39 | | | 1.44 |
| 8* | −4.176 | 0.40 | 1.5447 | 56.2 | 1.96 |
| 9* | 1.774 | 0.60 | | | 2.13 |
| 10 | ∞ | 0.10 | 1.5163 | 64.1 | 2.34 |
| 11 | ∞ | | | | 2.35 |

Aspheric surface coefficient $2^{nd}$ surface

K = 0.35094E+00
A4 = −0.11263E−01
A6 = 0.79305E−02
A8 = 0.55558E−02
A10 = 0.58712E−02

$3^{rd}$ surface

K = 0.30000E+02
A4 = 0.13368E−01
A6 = 0.73622E−01
A8 = 0.11057E+00
A10 = −0.64125E−01

$4^{th}$ surface

K = 0.25812E+02
A4 = −0.84316E−01
A6 = 0.12465E+00
A8 = −0.14103E+00
A10 = 0.33267E+00
A12 = −0.29113E+00

$5^{th}$ surface

K = −0.14526E+01
A4 = −0.66724E−02

TABLE 4-continued

Example 4
f = 3.57 mm fB = 0.21 mm F = 2.4 2Y = 4.48 mm
ENTP = 0 mm EXTP = −2.41 mm H1 = −1.3 mm H2 = −3.36 mm

A6 = 0.10745E+00
A8 = −0.19441E+00
A10 = 0.34628E+00
A12 = −0.19667E+00

$6^{th}$ surface

K = −0.11191E+02
A4 = −0.21899E−01
A6 = 0.61587E−02
A8 = −0.29490E−02
A10 = 0.40720E−02
A12 = −0.64209E−02

$7^{th}$ surface

K = −0.46113E+01
A4 = −0.11550E+00
A6 = 0.81022E−01
A8 = −0.23158E−01
A10 = 0.15907E−01
A12 = −0.61492E−02

$8^{th}$ surface

K = 0.12673E+01
A4 = −0.11320E+00
A6 = 0.75233E−01
A8 = −0.63941E−02
A10 = −0.43403E−02
A12 = 0.12551E−02
A14 = −0.10571E−03

$9^{th}$ surface

K = −0.13449E+02
A4 = −0.10126E+00
A6 = 0.44625E−01
A8 = −0.15411E−01
A10 = 0.30024E−02
A12 = −0.19975E−03
A14 = −0.49830E−05

Data of each single lens

| Lens No. | Front surface No. | Focal length (mm) |
|---|---|---|
| 1 | 2 | 2.880 |
| 2 | 4 | −4.601 |
| 3 | 6 | 2.385 |
| 4 | 8 | −2.233 |

Figure 11:
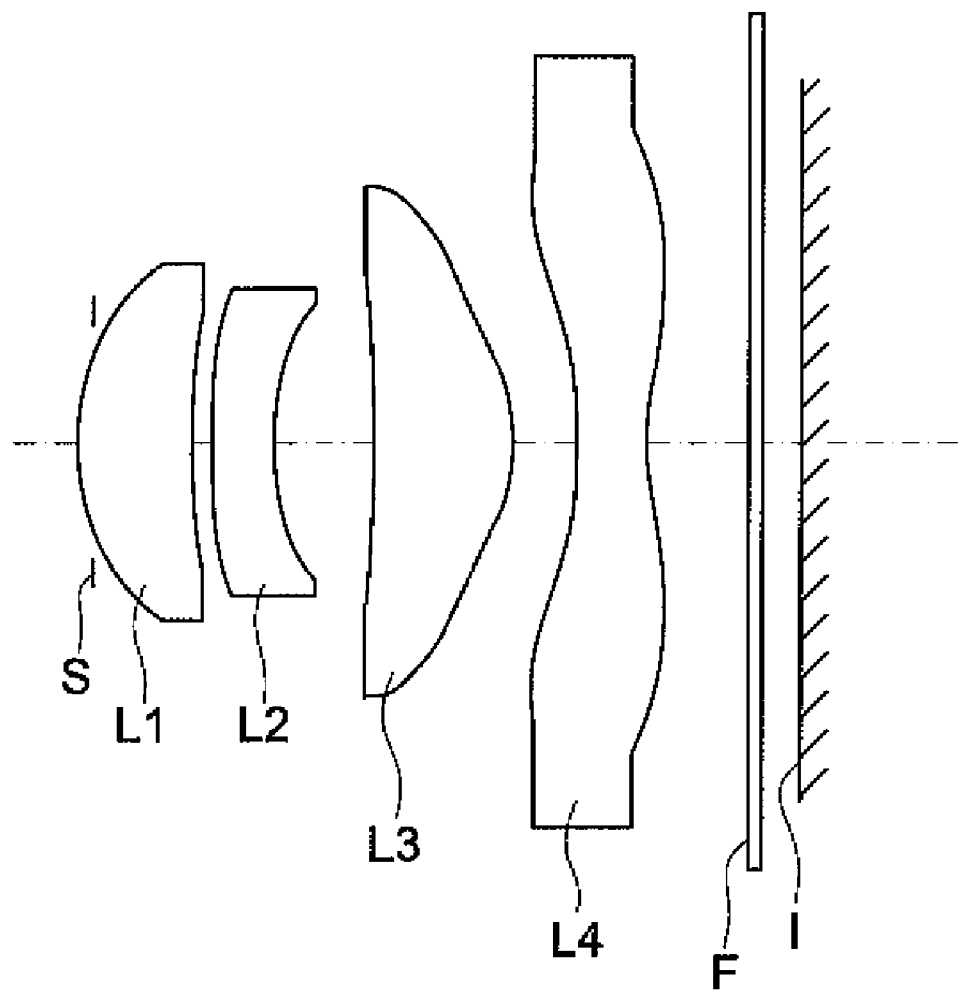
FIG. 11 is a sectional view in the direction of optical axis of the image pickup lens in Example 4.

FIG. 11 is a cross-sectional view of the image pickup lens shown in Example 4. FIG. 11 shows the first lens L1, the second lens L2, the third lens L3, the fourth lens L4, aperture stop S and image pickup surface I. Further, F represents a parallel flat plate assuming an optical lowpass filter, an IR blocking filter and a seal glass of a solid state image sensor. FIGS. 12(a)-12(d) are diagrams of aberrations (spherical aberration, astigmatism, distortion and meridional coma, respectively) of Example 4. In the present Example, all lenses are made of plastic materials, and aperture stop S overlaps with the surface facing the image side of the first lens L1, when it is viewed in the direction perpendicular to the optical axis.

Example 5

Lens data of an image pickup lens in Example 5 is shown in the following Table 5.

TABLE 5

Example 5
f = 4.22 mm fB = 0.36 mm F = 2.88 2Y = 5.67 mm
ENTP = 0 mm EXTP = −2.51 mm H1 = −1.98 mm H2 = −3.86 mm

| Surface No. | R (mm) | D (mm) | Nd | vd | Effective radius (mm) |
|---|---|---|---|---|---|
| 1 (stop) | ∞ | −0.05 | | | 0.73 |
| 2* | 1.721 | 0.72 | 1.5305 | 55.7 | 0.81 |
| 3* | 112.701 | 0.05 | | | 0.87 |
| 4* | 4.093 | 0.35 | 1.6320 | 23.4 | 0.91 |
| 5* | 1.784 | 0.64 | | | 0.95 |
| 6* | −6.829 | 0.68 | 1.5305 | 55.7 | 1.22 |
| 7* | −2.113 | 0.91 | | | 1.45 |
| 8* | 1.966 | 0.45 | 1.5305 | 55.7 | 2.36 |
| 9* | 1.029 | 0.55 | | | 2.59 |
| 10 | ∞ | 0.15 | 1.5163 | 64.1 | 2.83 |
| 11 | ∞ | | | | 2.86 |

Aspheric surface coefficient $2^{nd}$ surface

K = 0.55729E+00
A4 = −0.38753E−02
A6 = 0.27609E−02
A8 = 0.98052E−02
A10 = −0.66812E−02

$3^{rd}$ surface

K = −0.29942E+02
A4 = 0.59975E−01
A6 = 0.51917E−01
A8 = −0.20222E−01
A10 = 0.25252E−01

$4^{th}$ surface

K = −0.33428E+01
A4 = −0.11153E−01
A6 = 0.36383E−01
A8 = 0.11042E−01
A10 = −0.92394E−02

$5^{th}$ surface

K = −0.17683E+01
A4 = −0.18713E−02
A6 = 0.85150E−02
A8 = 0.24702E−01
A10 = −0.58353E−02

$6^{th}$ surface

K = 0.23461E+02
A4 = 0.57427E−02
A6 = 0.67849E−02
A8 = 0.13395E−01
A10 = −0.12626E−01
A12 = 0.38279E−02

$7^{th}$ surface

K = 0.11681E+00
A4 = 0.21033E−02
A6 = 0.14431E−01
A8 = 0.57187E−02
A10 = 0.11254E−02
A12 = −0.10355E−02

$8^{th}$ surface

K = −0.23571E+02
A4 = −0.14667E+00
A6 = 0.47567E−01
A8 = −0.64322E−02
A10 = 0.39912E−03
A12 = −0.90111E−05

$9^{th}$ surface

K = −0.68334E+01
A4 = −0.68534E−01
A6 = 0.16689E−01
A8 = −0.31920E−02

TABLE 5-continued

Example 5
f = 4.22 mm fB = 0.36 mm F = 2.88 2Y = 5.67 mm
ENTP = 0 mm EXTP = −2.51 mm H1 = −1.98 mm H2 = −3.86 mm

A10 = 0.38059E−03
A12 = −0.18592E−04

Data of each single lens

| Lens No. | Front surface No. | Focal length (mm) |
|---|---|---|
| 1 | 2 | 3.287 |
| 2 | 4 | −5.317 |
| 3 | 6 | 5.495 |
| 4 | 8 | −4.885 |

Figure 13:
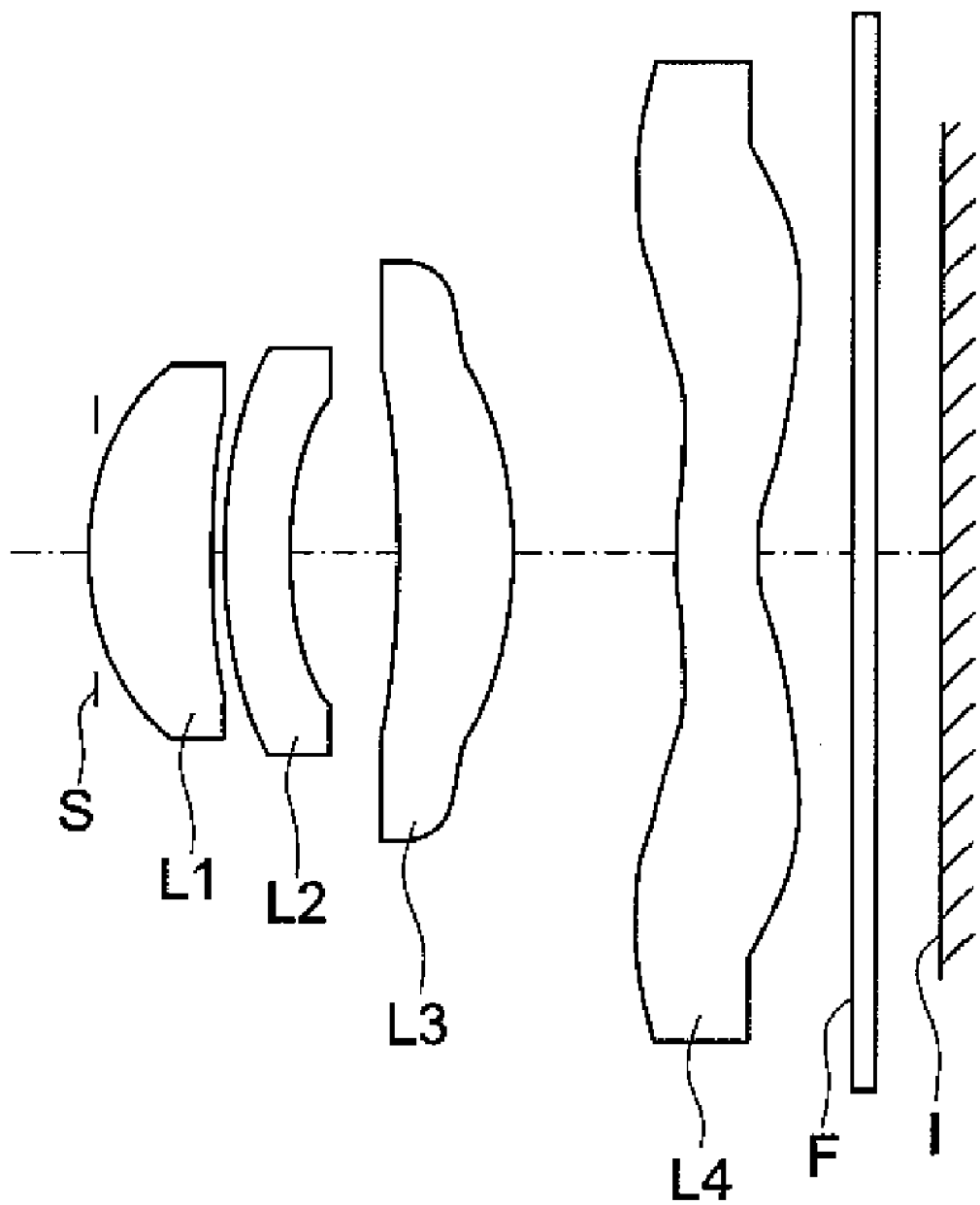
FIG. 13 is a sectional view in the direction of optical axis of the image pickup lens in Example 5.

FIG. 13 is a cross-sectional view of the image pickup lens shown in Example 5. FIG. 13 show the first lens L1, the second lens L2, the third lens L3, the fourth lens L4, aperture stop S and an image pickup surface I. Further, F represents a parallel flat plate assuming an optical lowpass filter, an IR blocking filter and a seal glass of a solid state image sensor. FIGS. 14(a)-14(d) are diagrams of aberrations (spherical aberration, astigmatism, distortion and meridional coma, respectively) of Example 5. In the present Example, all lenses are made with plastic materials, and aperture stop S overlaps with the surface facing the image side of the first lens L1, when it is viewed in the direction perpendicular to the optical axis.

Example 6

Lens data of an image pickup lens in Example 6 is shown in the following Table 6.

TABLE 6

Example 6
f = 3.41 mm fB = 0.29 mm F = 2.88 2Y = 4.48 mm
ENTP = 0 mm EXTP = −2.11 mm H1 = −1.45 mm H2 = −3.13 mm

| Surface No. | R (mm) | D (mm) | Nd | vd | Effective radius (mm) |
|---|---|---|---|---|---|
| 1 (stop) | ∞ | −0.05 | | | 0.59 |
| 2* | 1.346 | 0.58 | 1.5305 | 55.7 | 0.63 |
| 3* | 33.174 | 0.05 | | | 0.69 |
| 4* | 4.831 | 0.35 | 1.6320 | 23.4 | 0.72 |
| 5* | 1.870 | 0.45 | | | 0.74 |
| 6* | −4.830 | 0.55 | 1.5305 | 55.7 | 0.92 |
| 7* | −1.781 | 0.43 | | | 1.19 |
| 8* | 2.231 | 0.45 | 1.5305 | 55.7 | 1.68 |
| 9* | 1.024 | 0.60 | | | 1.90 |
| 10 | ∞ | 0.10 | 1.5163 | 64.1 | 2.23 |
| 11 | ∞ | | | | 2.26 |

Aspheric surface coefficient $2^{nd}$ surface

K = −0.14058E+00
A4 = 0.31142E−02
A6 = 0.25922E−01
A8 = −0.11575E−01
A10 = 0.39679E−01

$3^{rd}$ surface

K = −0.29882E+02
A4 = 0.33857E−01
A6 = 0.15875E+00
A8 = −0.82702E−02
A10 = 0.64267E−01

TABLE 6-continued

Example 6
f = 3.41 mm fB = 0.29 mm F = 2.88 2Y = 4.48 mm
ENTP = 0 mm EXTP = −2.11 mm H1 = −1.45 mm H2 = −3.13 mm $4^{th}$ surface K = −0.78222E+01
A4 = −0.60319E−02
A6 = 0.17252E+00
A8 = 0.67804E−01
A10 = −0.91489E−01

$5^{th}$ surface

K = −0.57069E+00
A4 = 0.31967E−01
A6 = 0.34901E−01
A8 = 0.10801E+00
A10 = 0.48586E−01

$6^{th}$ surface

K = 0.19789E+02
A4 = 0.96847E−01
A6 = −0.13518E+00
A8 = 0.13742E+00
A10 = −0.63500E−01

$7^{th}$ surface

K = −0.30657E+01
A4 = 0.33532E−01
A6 = −0.26154E−01
A8 = 0.37142E−01
A10 = 0.19409E−01
A12 = −0.19385E−01

$8^{th}$ surface

K = −0.30000E+02
A4 = −0.25758E+00
A6 = 0.13439E+00
A8 = −0.30166E−01
A10 = 0.39220E−02
A12 = −0.33853E−03

$9^{th}$ surface

K = −0.71208E+01
A4 = −0.14370E+00
A6 = 0.49280E−01
A8 = −0.12456E−01
A10 = 0.16326E−02
A12 = −0.72340E−04

Data of each single lens

| Lens No. | Front surface No. | Focal length (mm) |
|---|---|---|
| 1 | 2 | 2.628 |
| 2 | 4 | −5.060 |
| 3 | 6 | 5.002 |
| 4 | 8 | −4.092 |

Figure 15:
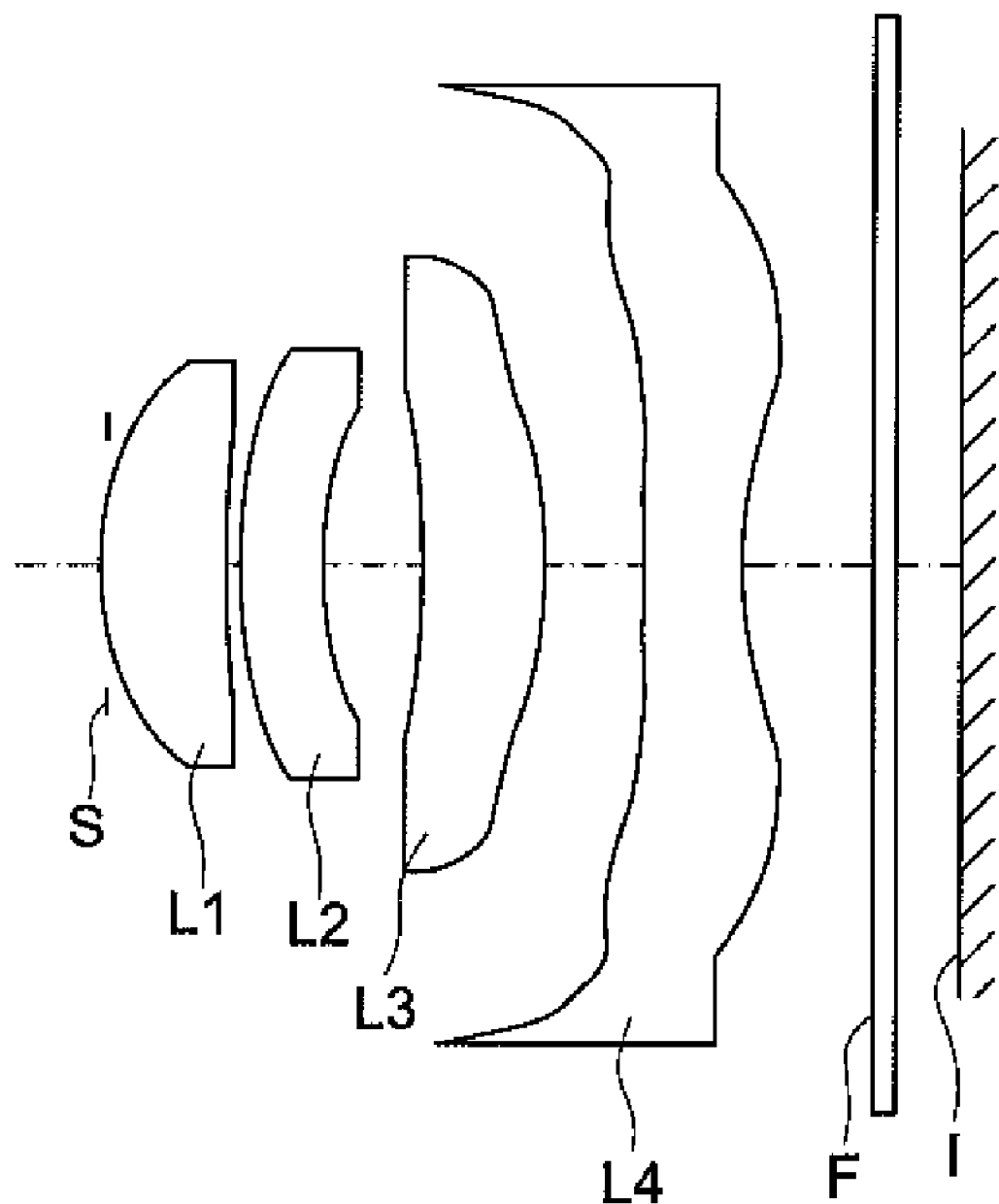
FIG. 15 is a sectional view in the direction of optical axis of the image pickup lens in Example 6.

FIG. 15 is a cross-sectional view of the image pickup lens shown in Example 6. FIG. 15 shows the first lens L1, the second lens L2, the third lens L3, the fourth lens L4, aperture stop S and image pickup surface I. Further, F represents a parallel flat plate assuming an optical lowpass filter, an IR blocking filter and a seal glass of a solid state image sensor. FIGS. 16(a)-16(d) are diagrams of aberrations (spherical aberration, astigmatism, distortion and meridional coma, respectively) of Example 6. In the present Example, all lenses are made with plastic materials, and aperture stop S overlaps with the surface facing the image side of the first lens L1, when it is viewed in the direction perpendicular to the optical axis.

Example 7

Lens data of an image pickup lens in Example 7 is shown in the following Table 7.

TABLE 7

Example 7
f = 3.43 mm fB = 0.59 mm F = 2.88 2Y = 4.48 mm
ENTP = 0 mm EXTP = −2.08 mm H1 = −0.98 mm H2 = −2.84 mm

| Surface No. | R (mm) | D (mm) | Nd | νd | Effective radius (mm) |
|---|---|---|---|---|---|
| 1 (stop) | ∞ | −0.03 | | | 0.59 |
| 2* | 1.305 | 0.66 | 1.5447 | 56.2 | 0.74 |
| 3* | 4.366 | 0.15 | | | 0.73 |
| 4* | 5.863 | 0.35 | 1.6320 | 23.4 | 0.77 |
| 5* | 2.274 | 0.37 | | | 0.87 |
| 6* | −8.635 | 0.86 | 1.5318 | 56.0 | 1.09 |
| 7* | −0.979 | 0.17 | | | 1.33 |
| 8* | −80.000 | 0.45 | 1.5318 | 56.0 | 1.61 |
| 9* | 1.055 | 0.40 | | | 1.94 |
| 10 | ∞ | 0.10 | 1.5163 | 64.1 | 2.14 |
| 11 | ∞ | | | | 2.16 |

Aspheric surface coefficient $2^{nd}$ surface

K = 0.31675E+00
A4 = 0.18970E−02
A6 = 0.65448E−01
A8 = −0.54317E−01
A10 = −0.13968E−01
A12 = 0.95548E−01

$3^{rd}$ surface

K = 0.29811E+02
A4 = 0.36972E−01
A6 = 0.17869E+00
A8 = 0.43013E−01
A10 = −0.11552E+00
A12 = 0.66922E−02

$4^{th}$ surface

K = 0.29953E+02
A4 = −0.72880E−01
A6 = 0.14079E+00
A8 = 0.48385E−02
A10 = −0.70431E−01
A12 = −0.10314E+00

$5^{th}$ surface

K = 0.11145E+01
A4 = −0.11563E−01
A6 = 0.50003E−01
A8 = −0.28494E−01
A10 = 0.25278E−01
A12 = −0.40452E−01

$6^{th}$ surface

K = −0.10701E+01
A4 = 0.59985E−01
A6 = −0.17170E−01
A8 = 0.99974E−02
A10 = −0.23014E−02
A12 = 0.13931E−02
A14 = −0.26374E−02

$7^{th}$ surface

K = −0.44099E+01
A4 = −0.79791E−01
A6 = 0.72885E−01
A8 = −0.16037E−01
A10 = 0.15434E−01
A12 = −0.57186E−02
A14 = −0.26169E−03

TABLE 7-continued

Example 7
f = 3.43 mm fB = 0.59 mm F = 2.88 2Y = 4.48 mm
ENTP = 0 mm EXTP = −2.08 mm H1 = −0.98 mm H2 = −2.84 mm 8$^{th}$ surface K = 0.30000E+02
A4 = −0.15986E+00
A6 = 0.48388E−01
A8 = 0.22316E−01
A10 = −0.19954E−01
A12 = 0.62879E−02
A14 = −0.77556E−03

9$^{th}$ surface

K = −0.70824E+01
A4 = −0.13127E+00
A6 = 0.60402E−01
A8 = −0.20643E−01
A10 = 0.39727E−02
A12 = −0.41828E−03
A14 = 0.18844E−04

Data of each single lens

| Lens No. | Front surface No. | Focal length (mm) |
|---|---|---|
| 1 | 2 | 3.176 |
| 2 | 4 | −6.109 |
| 3 | 6 | 1.998 |
| 4 | 8 | −1.955 |

Figure 17:
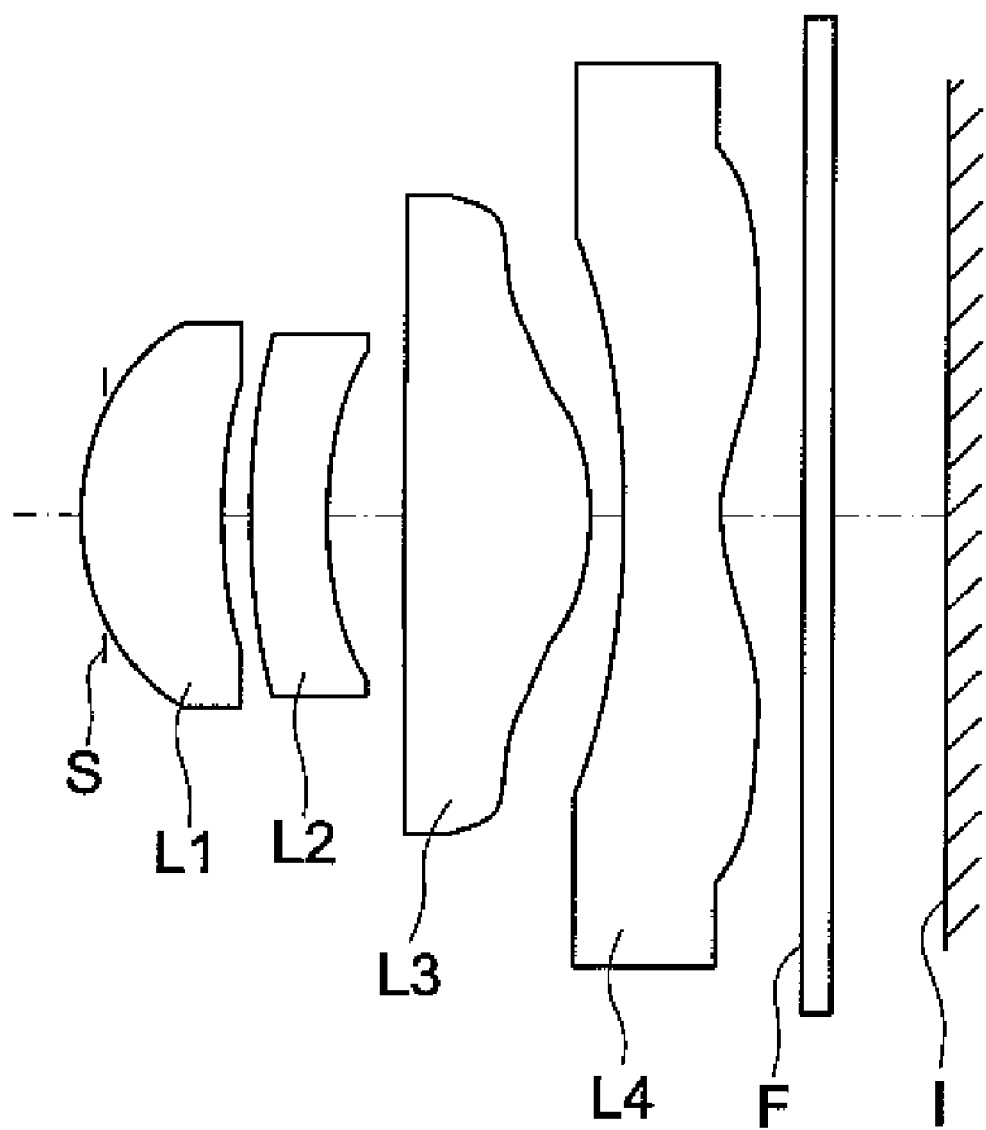
FIG. 17 is a sectional view in the direction of optical axis of the image pickup lens in Example 7.

FIG. 17 is a cross-sectional view of the image pickup lens shown in Example 7. FIG. 17 shows the first lens L1, the second lens L2, the third lens L3, the fourth lens L4, aperture stop S and an image pickup surface I. Further, F represents a parallel flat plate assuming an optical lowpass filter, an IR blocking filter and a seal glass of a solid state image sensor. FIGS. 18(a)-18(d) are diagrams of aberrations (spherical aberration, astigmatism, distortion and meridional coma, respectively) of Example 7. In the present Example, all lenses are made with plastic materials, 1 and aperture stop S overlaps with the surface facing the image side of the first lens L1, when it is viewed in the direction perpendicular to the optical axis.

Example 8

Lens data of an image pickup lens in Example 8 is shown in the following Table 8.

TABLE 8

Example 8
f = 3.43 mm fB = 0.59 mm F = 2.88 2Y = 4.48 mm
ENTP = 0 mm EXTP = −2.07 mm H1 = −1 mm H2 = −2.85 mm

| Surface No. | R (mm) | D (mm) | Nd | vd | Effective radius (mm) |
|---|---|---|---|---|---|
| 1 (stop) | ∞ | −0.02 | | | 0.59 |
| 2* | 1.498 | 0.55 | 1.5447 | 56.2 | 0.64 |
| 3* | 5.681 | 0.25 | | | 0.71 |
| 4* | 3.513 | 0.35 | 1.6320 | 23.4 | 0.82 |
| 5* | 2.053 | 0.37 | | | 0.87 |
| 6* | −7.741 | 0.78 | 1.5318 | 56.0 | 1.04 |
| 7* | −1.013 | 0.27 | | | 1.27 |
| 8* | −7.724 | 0.45 | 1.5318 | 56.0 | 1.62 |
| 9* | 1.252 | 0.40 | | | 1.93 |
| 10 | ∞ | 0.10 | 1.5163 | 64.1 | 2.14 |
| 11 | ∞ | | | | 2.16 |

TABLE 8-continued

Example 8
f = 3.43 mm fB = 0.59 mm F = 2.88 2Y = 4.48 mm
ENTP = 0 mm EXTP = −2.07 mm H1 = −1 mm H2 = −2.85 mm Aspheric surface coefficient 2$^{nd}$ surface K = 0.33619E+00
A4 = 0.93322E−02
A6 = 0.54240E−02
A8 = 0.23166E−01
A10 = −0.89902E−02
A12 = −0.56210E−02

3$^{rd}$ surface

K = 0.30000E+02
A4 = 0.91286E−02
A6 = 0.16060E+00
A8 = −0.91755E−01
A10 = −0.78439E−01
A12 = 0.11968E+00

4$^{th}$ surface

K = 0.37760E+01
A4 = −0.73421E−01
A6 = 0.12404E+00
A8 = −0.19546E−01
A10 = −0.29699E−01
A12 = −0.23984E−01

5$^{th}$ surface

K = 0.17132E−01
A4 = −0.30207E−01
A6 = 0.54841E−01
A8 = 0.37048E−03
A10 = 0.33829E−01
A12 = −0.32294E−01

6$^{th}$ surface

K = 0.23328E+01
A4 = 0.41158E−01
A6 = 0.46528E−02
A8 = 0.43069E−02
A10 = −0.60932E−02
A12 = 0.20281E−03

7$^{th}$ surface

K = −0.39655E+01
A4 = −0.87058E−01
A6 = 0.10405E+00
A8 = −0.13124E−01
A10 = 0.13870E−01
A12 = −0.88304E−02

8$^{th}$ surface

K = 0.16221E+02
A4 = −0.14307E+00
A6 = 0.79933E−01
A8 = 0.72441E−02
A10 = −0.17882E−01
A12 = 0.61680E−02
A14 = −0.73070E−03

9$^{th}$ surface

K = −0.87799E+01
A4 = −0.12318E−00
A6 = 0.52670E−01
A8 = −0.15440E−01
A10 = 0.26580E−02
A12 = −0.32064E−03
A14 = 0.22599E−04

Data of each single lens

| Lens No. | Front surface No. | Focal length (mm) |
|---|---|---|
| 1 | 2 | 3.572 |
| 2 | 4 | −8.623 |

TABLE 8-continued

Example 8
f = 3.43 mm fB = 0.59 mm F = 2.88 2Y = 4.48 mm
ENTP = 0 mm EXTP = −2.07 mm H1 = −1 mm H2 = −2.85 mm

| 3 | 6 | 2.107 |
| 4 | 8 | −1.991 |

Figure 19:
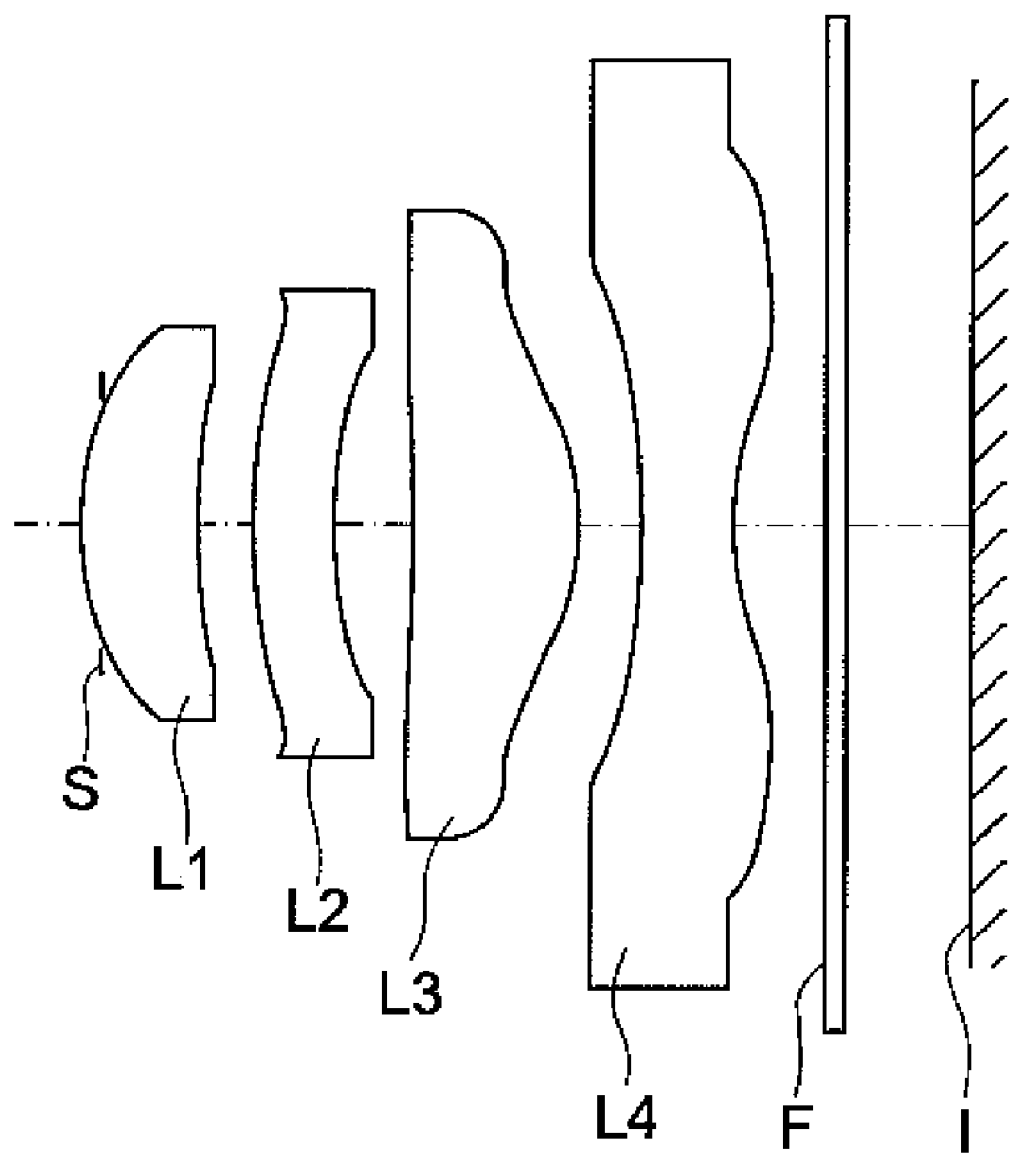
FIG. 19 is a sectional view in the direction of optical axis of the image pickup lens in Example 8.

FIG. 19 is a cross-sectional view of the image pickup lens shown in Example 8. FIG. 19 shows the first lens L1, the second lens L2, the third lens L3, the fourth lens L4, aperture stop S and image pickup surface I. Further, F represents a parallel flat plate assuming an optical lowpass filter, an IR blocking filter and a seal glass of a solid state image sensor. FIGS. 20(a)-20(d) are diagrams of aberrations (spherical aberration, astigmatism, distortion and meridional coma, respectively) of Example 8. In the present Example, all lenses are made with plastic materials, and aperture stop S overlaps with the surface facing the image side of the first lens L1, when it is viewed in the direction perpendicular to the optical axis.

Table 9 shows values of Examples corresponding to the conditional expressions.

TABLE 9

| | Example 1 | Example 2 | Example 3 | Example 4 | Example 5 | Example 6 | Example 7 | Example 8 |
|---|---|---|---|---|---|---|---|---|
| (1) f12/f | 1.34 | 1.52 | 1.28 | 1.40 | 1.40 | 1.20 | 1.41 | 1.42 |
| (2) f2/f | −1.35 | −1.03 | −1.34 | −1.29 | −1.26 | −1.48 | −1.78 | −2.51 |
| (3) ν2 | 23.4 | 30.0 | 23.4 | 23.4 | 23.4 | 23.4 | 23.4 | 23.4 |
| (4) n2 | 1.632 | 1.583 | 1.632 | 1.632 | 1.632 | 1.632 | 1.632 | 1.632 |

As for a lens material, plastic materials tend to have a refractive index which largely changes due to temperature change, and an image point of the total system of the image pickup lens is sometimes fluctuated due to a change of the environmental temperature when all of the first lens through the fourth lens are formed as plastic lenses, which is a problem.

In recent years, it has been known that the temperature changes of plastic materials can be made small by blending inorganic microparticles in a plastic material. The detailed explanation is described below. When microparticles are blended in a transparent plastic material, the plastic materials has been hardly used as optical materials because transmittance of the transparent plastic materials is lowered due to scattering of light. However, it is possible not to cause the scattering substantially by reducing the size of microparticles to be smaller than a wavelength of a transmitting light flux. A plastic material has a refractive index decreasing when its temperature rises, while, inorganic particles have a refractive index increasing when its temperature rises. It is therefore possible that a change in refractive index hardly occurs by employing a plastic material and inorganic particles whose temperature dependencies work to cancel each other. Specifically, by dispersing inorganic particles whose largest side is 20 nm or less into a plastic material representing a base material, it is possible to realize a plastic material having a refractive index whose temperature dependency is extremely low. For example, by dispersing microparticles of niobium oxide ($Nb_2O_5$) into acrylic resin, the material can provide reduced change in the refractive index caused by temperature changes. In the above examples, by employing plastic materials in which the aforesaid inorganic particles are dispersed, for positive lens (L1) whose refractive power is relatively large or for all lenses (L1 to L4), the fluctuation of image point position caused by temperature changes in the total system of image pickup lens can be controlled to be small.

Incidentally, each of the above Examples is not necessarily designed such that an incident angle of a principal ray of the light flux that enters an image pickup surface of a solid-state image pickup element is sufficiently small at a peripheral portion of the image pickup surface. However, in the recent technology, it has become possible to reduce shading by a revision of an arrangement of a color filter of a solid-state image pickup element and an onchip-microlens-array. Specifically, if a pitch of the arrangement of the color filter and the onchip-microlens-array is designed to be slightly smaller compared with a pixel pitch of the image pickup surface of the imaging device, a light flux of oblique incidence can be guided efficiently, because the color filter and the onchip-microlens-array are shifted greater toward an optical axis of an image pickup lens at the position which is closer to a peripheral portion of the image pickup surface. Owing to this, shading generated on the solid-state imaging device can be controlled to be small. The present Examples provide design examples in which the above design requirement about the incident angle of the principal ray is lighten and the design requirement for downsizing is stronger.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An image pickup lens for forming an image of an object on a photoelectrical converter of a solid-state image pickup element, the image pickup lens comprising, in order from an object side thereof:
    a first lens in a meniscus shape having a positive refractive power and comprising a convex surface facing the object side;
    a second lens having a negative refractive power and comprising a concave surface facing an image side of the image pickup lens;
    a third lens in a meniscus shape having a positive refractive power and comprising a convex surface facing the image side; and
    a fourth lens having a negative refractive power and comprising a concave surface facing the image side, at least one surface of the fourth lens being in an aspheric shape,
    wherein the image pickup lens satisfies the following expression:

$$1.10 < f12/f < 1.75,$$

where f12 is a composite focal length of the first lens and the second lens, and
f is a focal length of a total system of the image pickup lens.

2. The image pickup lens of claim 1, further comprising:
    an aperture stop, wherein the aperture stop overlaps with at least a part of the surface of the first lens facing the object side, when viewing the image pickup lens in a direction perpendicular to an optical axis of the image pickup lens, and wherein the aperture stop is arranged at a position closer to the image side than a top of the convex surface facing the object side of the first lens.

3. The image pickup lens of claim 1, satisfying the following expression:

$$-3.0 < f2/f < -0.5,$$

wherein f2 is a focal length of the second lens.

4. The image pickup lens of claim 1, satisfying the following expression:\

$$15 < v2 < 27,$$

where v2 is an Abbe number of the second lens.

5. The image pickup lens of claim 1, satisfying the following expression:

$$1.60 < n2 < 2.00,$$

where n2 is a refractive index of the second lens for d line.

6. The image pickup lens of claim 1,
wherein the second lens is in a meniscus shape and comprises a convex surface facing the object side.

7. The image pickup lens of claim 1,
wherein the surface of the fourth lens facing the image side is in an aspheric shape on which a center portion has a negative refractive power, and the negative refractive power becomes smaller at a position being farther from the center portion to a periphery, and
the surface of the fourth lens facing the image side includes an inflection point.

8. The image pickup lens of claim 1,
wherein the fourth lens is a bi-concave lens.

9. The image pickup lens of claim 1,
wherein each of the first to fourth lenses is formed of a plastic material.

10. An image pickup unit comprising:
the image pickup lens of claim 1.

11. A mobile terminal comprising the image pickup unit of claim 10.

* * * * *